United States Patent
Tanaka et al.

(10) Patent No.: US 8,265,849 B2
(45) Date of Patent: Sep. 11, 2012

(54) DRIVE SYSTEM FOR ELECTRICALLY DRIVEN DUMP TRUCK

(75) Inventors: Yasuo Tanaka, Yokohama (JP); Tomohiko Yasuda, Kashiwa (JP); Takashi Yagyu, Ushiku (JP); Yutaka Watanabe, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 1063 days.

(21) Appl. No.: 12/279,476

(22) PCT Filed: May 7, 2007

(86) PCT No.: PCT/JP2007/059456
§ 371 (c)(1),
(2), (4) Date: Aug. 14, 2008

(87) PCT Pub. No.: WO2007/141980
PCT Pub. Date: Dec. 13, 2007

(65) Prior Publication Data
US 2009/0048064 A1 Feb. 19, 2009

(30) Foreign Application Priority Data
Jun. 6, 2006 (JP) .................................. 2006-157679

(51) Int. Cl.
*B60W 10/08* (2006.01)
*B60W 20/00* (2006.01)

(52) U.S. Cl. .............. 701/84; 701/87; 701/90; 477/3; 180/65.265; 318/452; 318/66; 318/34; 318/140; 318/148

(58) Field of Classification Search . 477/3; 180/65.265; 701/102, 50, 22, 84, 87, 90; 318/66, 34, 318/140
See application file for complete search history.

(56) References Cited

U.S. PATENT DOCUMENTS

| | | | | |
|---|---|---|---|---|
| 4,719,361 A * | 1/1988 | Brubaker | ....................... | 290/45 |
| 5,280,223 A * | 1/1994 | Grabowski et al. | ........... | 318/139 |
| 5,289,890 A * | 3/1994 | Toyoda et al. | ............... | 180/65.8 |
| 5,550,445 A * | 8/1996 | Nii | ................................. | 318/153 |
| 5,890,992 A * | 4/1999 | Salecker et al. | ................ | 477/86 |
| 5,939,846 A * | 8/1999 | Young et al. | ..................... | 318/98 |
| 5,988,307 A * | 11/1999 | Yamada et al. | ................ | 180/243 |
| 6,340,847 B1 * | 1/2002 | Kawabata et al. | .......... | 290/40 C |
| 6,519,513 B2 * | 2/2003 | Nakagawa et al. | ............. | 701/22 |

(Continued)

FOREIGN PATENT DOCUMENTS
EP 1 147 937 10/2001
(Continued)

*Primary Examiner* — Thomas G. Black
*Assistant Examiner* — Wae Louie
(74) *Attorney, Agent, or Firm* — Mattingly & Malur, PC

(57) ABSTRACT

A drive system of an electrically driven dump truck is capable of achieving an operational feeling in which the operation amount of the accelerator pedal is well balanced with the output horsepower of the electric motors, particularly at the time of slow traveling. To achieve this, the target motor output horsepower Pm0 corresponding to the operation amount of an accelerator pedal 1 is calculated. The target motor torque Tr1R, Tr1L is calculated on the basis of the target motor output horsepower Pm0 and the rotational speed ωR, ωL of electric motors 12R, 12L respectively. The acceleration torque limit values of the electric motors 12R, 12L corresponding to the operation amount of the accelerator pedal 1 are calculated, respectively. Then, smaller values are selected, as motor torque instruction values TrR, TrL, between the acceleration torque limit value and the target motor torque Tr1R, Tr1L to control inverters 73R, 73L, respectively.

6 Claims, 13 Drawing Sheets

U.S. PATENT DOCUMENTS

| | | | |
|---|---|---|---|
| 6,959,241 B2* | 10/2005 | Itow et al. | 701/102 |
| 7,863,837 B2* | 1/2011 | Tanaka et al. | 318/66 |
| 2003/0080704 A1* | 5/2003 | Wakitani et al. | 318/432 |
| 2005/0071064 A1* | 3/2005 | Nakamura et al. | 701/50 |
| 2009/0048064 A1* | 2/2009 | Tanaka et al. | 477/3 |
| 2009/0132116 A1* | 5/2009 | Tanaka et al. | 701/36 |
| 2009/0251090 A1* | 10/2009 | Tanaka et al. | 318/452 |
| 2010/0222951 A1* | 9/2010 | Tanaka et al. | 701/22 |

FOREIGN PATENT DOCUMENTS

| | | |
|---|---|---|
| JP | 2001-107762 | 4/2001 |
| JP | 2002-369314 | 12/2002 |

* cited by examiner

DRIVE SYSTEM FOR ELECTRICALLY DRIVEN DUMP TRUCK

TECHNICAL FIELD

The present invention relates to a drive system for an electrically driven dump truck, and more particularly to a drive system for a large dump truck that drives an electric generator by a prime mover, and that drives an electric motor for traveling by the electric power so as to cause the dump truck to travel, the electric power being generated by the electric generator.

BACKGROUND ART

As described in, for example, a patent document 1, a drive system of an electrically driven dump truck includes: a prime mover; an electronic governor for controlling the revolution speed and torque of the prime mover; an alternating-current generator driven by the prime mover; two electric motors, each of which is driven by the electric power supplied by the alternating-current generator, the two electric motors driving, for example, right and left rear wheels; two inverters, each of which is connected to the alternating-current generator, and each of which controls each of the electric motors (for example, induction motors); and a control unit for calculating the target revolution speed corresponding to the operation amount of an accelerator pedal to control the electronic governor, and for calculating torque instruction values of the two electric motors in response to the operation amount of the accelerator pedal to control the two inverters on the basis of the torque instruction values so that each of the electric motors is controlled.

Patent document 1: JP-A-2001-107762

DISCLOSURE OF INVENTION

Problems to be Solved by the Invention

As is usual with the conventional electrically driven dump trucks, as described in the patent document 1, torque instruction values of electric motors are calculated in response to the operation amount of the accelerator pedal, and then inverters are controlled on the basis of the torque instruction values so as to control the torque of the electric motors. However, when the electric motors are controlled in this manner, the output horsepower of the electric motors does not directly respond to the operation amount of the accelerator pedal. Accordingly, the operational feeling at the time of pressing down the accelerator pedal is not good. In order to solve this problem, it is thought that the target output horsepower of the electric motors is calculated corresponding to the operation amount of the accelerator pedal, and then the target output horsepower is divided by the rotational speed of the electric motors at this point of time to calculate the target torque (torque instruction values) of the electric motors. This method, however, is accompanied with a problem as described below.

At the time of normal traveling (for example, when the dump truck is moved to another place), the target output horsepower of the electric motors corresponding to the operation amount of the accelerator pedal is calculated to control the electric motors. Accordingly, the operation amount of the accelerator pedal becomes well balanced with the motor output horsepower. This makes it possible to achieve excellent operational feeling. However, as the traveling operation of the dump truck, there is the traveling operation of very slowly moving the dump truck so as to position the dump truck. For example, the dump truck is stopped at a loading position near from an excavator, or the dump truck is moved onto a load meter. In the case of the traveling operation as described above, if the target output horsepower of the electric motors corresponding to the operation amount of the accelerator pedal is calculated to control the electric motors, the motor torque, and the change in torque, become excessively large. Accordingly, the controllability at the time of very slow traveling becomes worse. This makes it difficult to very slowly move the dump truck so that the dump truck is positioned at a desired position.

An object of the present invention is to provide a control system of an electrically driven dump truck that is capable of achieving the excellent operational feeling in which the operation amount of the accelerator pedal is well balanced with the output horsepower of the electric motors, and that is capable of improving the controllability at the time of very slow traveling so that a delicate positioning can be made.

Means for Solving the Problems (1) In order to achieve the above-described object, according to one aspect of the present invention, there is provided a drive system of an electrically driven dump truck, the drive system comprising:

a prime mover;

an alternating-current generator driven by the prime mover;

at least two electric motors for traveling, each of which is driven by the electric power supplied by the alternating-current generator;

at least two inverters, each of which is connected to the alternating-current generator, and each of which controls each of the electric motors, and motor control means for controlling the inverters in response to the operation amount of an accelerator pedal to control the electric motors;

wherein:

the motor control means includes:

target motor output horsepower calculation means for calculating the target motor output horsepower corresponding to the operation amount of the accelerator pedal;

target motor torque calculation means for calculating the target motor torque on the basis of the target motor output horsepower and the rotational speed of the two electric motors;

acceleration torque limit value calculation means for calculating acceleration torque limit values of the two electric motors corresponding to the operation amount of the accelerator pedal;

motor torque instruction value determination means for, when the acceleration torque limit values are larger than the target motor torque, selecting the target motor torque as motor torque instruction values, and for, when the acceleration torque limit values become smaller than the target motor torque, selecting the acceleration torque limit values as motor torque instruction values; and inverter control means for controlling the inverters on the basis of the motor torque instruction values.

According to the present invention configured in this manner, as the operation amount of the accelerator pedal at the time of normal traveling, the acceleration torque limit value calculation means makes a calculation to obtain acceleration torque limit values that are larger than the target motor torque, whereas as the operation amount of the accelerator pedal at the time of very slow traveling, the acceleration torque limit value calculation means makes a calculation to obtain acceleration torque limit values that are smaller than the target motor torque. Thus, at the time of normal traveling, the motor torque instruction value determination means selects the target motor torque as motor torque instruction values, whereas at the time of very slow traveling, the motor torque instruction value determination means selects the acceleration torque limit values as motor torque instruction values. As a result, at the time of normal traveling, by controlling the traveling on the basis of the target motor output horsepower that has been calculated by the target motor output horsepower calculation means, it is possible to achieve excellent operational feeling in which the operation amount of the accelerator pedal is well balanced with the output horsepower of the electric motors. On the other hand, at the time of very slow traveling, by controlling the traveling on the basis of the acceleration torque limit values that has been calculated by the acceleration torque limit value calculation means, it is possible to achieve excellent controllability, and to easily make a delicate positioning.

(2) In the above-described item (1), preferably, the acceleration torque limit value calculation means calculates the acceleration torque limit values on the basis of acceleration torque limit value characteristics that are configured as follows: when the operation amount of the accelerator pedal is at 0, the acceleration torque limit values are the low range torque that is suitable for very slow traveling; when the operation amount of the accelerator pedal falls within a range from 0 to the medium operation amount, which includes a small operation amount area, with the increase in the operation amount of the accelerator pedal, the acceleration torque limit values increase from the minimum torque up to a high range torque that is suitable for very slow traveling; and when the operation amount of the accelerator pedal further increases, the acceleration torque limit values increase up to the maximum torque.

As a result, at the time of normal traveling, the motor torque instruction value determination means selects the target motor torque as the motor torque instruction values, whereas at the time of very slow traveling, the motor torque instruction value determination means selects the acceleration torque limit values as the motor torque instruction values.

(3) In addition, in the above-described item (1), preferably, the low range torque, which is suitable for very slow traveling, ranges from 15% to 30% of the maximum allowable motor torque that is predetermined in response to the rotational speed of the electric motors; the high range torque, which is suitable for very slow traveling, ranges from 30% to 50% of the maximum allowable motor torque; and the medium operation amount ranges 40% to 60% of the maximum operation amount.

As a result, at the time of normal traveling, the motor torque instruction value determination means selects the target motor torque as the motor torque instruction values within a range of the maximum allowable motor torque, whereas at the time of very slow traveling, the motor torque instruction value determination means selects the acceleration torque limit values as the motor torque instruction values within the range of the maximum allowable motor torque.

(4) In addition, in the above-described item (1), it is desirable that the acceleration torque limit value calculation means calculates, as the acceleration torque limit values, the motor acceleration torque corresponding to the operation amount of the accelerator pedal, and that the motor torque instruction value determination means compares among the target motor torque, the motor acceleration torque, and the maximum allowable motor torque, which is predetermined in response to the rotational speed of the electric motors, so that the minimum values are selected among them.

As a result, at the time of normal traveling, the motor torque instruction value determination means selects the target motor torque as the motor torque instruction values within the range of the maximum allowable motor torque, whereas at the time of very slow traveling, the motor torque instruction value determination means selects the acceleration torque limit values as the motor torque instruction values within the range of the maximum allowable motor torque.

(5) In the above-described item (1), the acceleration torque limit value calculation means may also calculate the maximum motor torque as the acceleration torque limit values, the maximum motor torque being a value that is obtained by multiplying the maximum allowable motor torque, which is predetermined in response to the rotational speed of the electric motors, by a motor torque limit ratio that is calculated in response to the operation amount of the accelerator pedal. In this case, the motor torque instruction value determination means compares the target motor torque with the maximum motor torque so that each minimum value is selected between them.

Also as a result, at the time of normal traveling, the motor torque instruction value determination means selects the target motor torque as the motor torque instruction values within the range of the maximum allowable motor torque, whereas at the time of very slow traveling, the motor torque instruction value determination means selects the acceleration torque limit values as the motor torque instruction values within the range of the maximum allowable motor torque.

(6) Moreover, in the above-described items (1) through (5), the drive system further include: maximum horsepower calculation means for, in response to the revolution speed of the prime mover, calculating an available maximum horsepower for the electric motors for traveling; and motor output horsepower limiting means for limiting the target motor output horsepower calculated by the target motor output horsepower calculation means so that the target motor output horsepower does not exceed the maximum horsepower calculated by the maximum horsepower calculation means. The target motor torque calculation means calculates the target motor torque from the target motor output horsepower received from the motor output horsepower limiting means, and from the rotational speed of the two electric motors.

As a result, for example, even if the revolution speed of the prime mover does not sufficiently increase at the time of the acceleration during traveling, which causes the target motor output horsepower calculated by the target motor output horsepower calculation means to exceed the maximum horsepower calculated by the maximum horsepower calculation means, the target motor output horsepower is limited to the maximum horsepower. Therefore, it is possible to prevent the prime mover from stalling.

Effects of Invention

According to the present invention, it is possible to achieve the excellent operational feeling in which the operation amount of the accelerator pedal is well balanced with the output horsepower of the electric motors, and to achieve the excellent controllability at the time of very slow traveling so that a delicate positioning can be easily made.

DESCRIPTION OF REFERENCE NUMBERS

Figure 1:
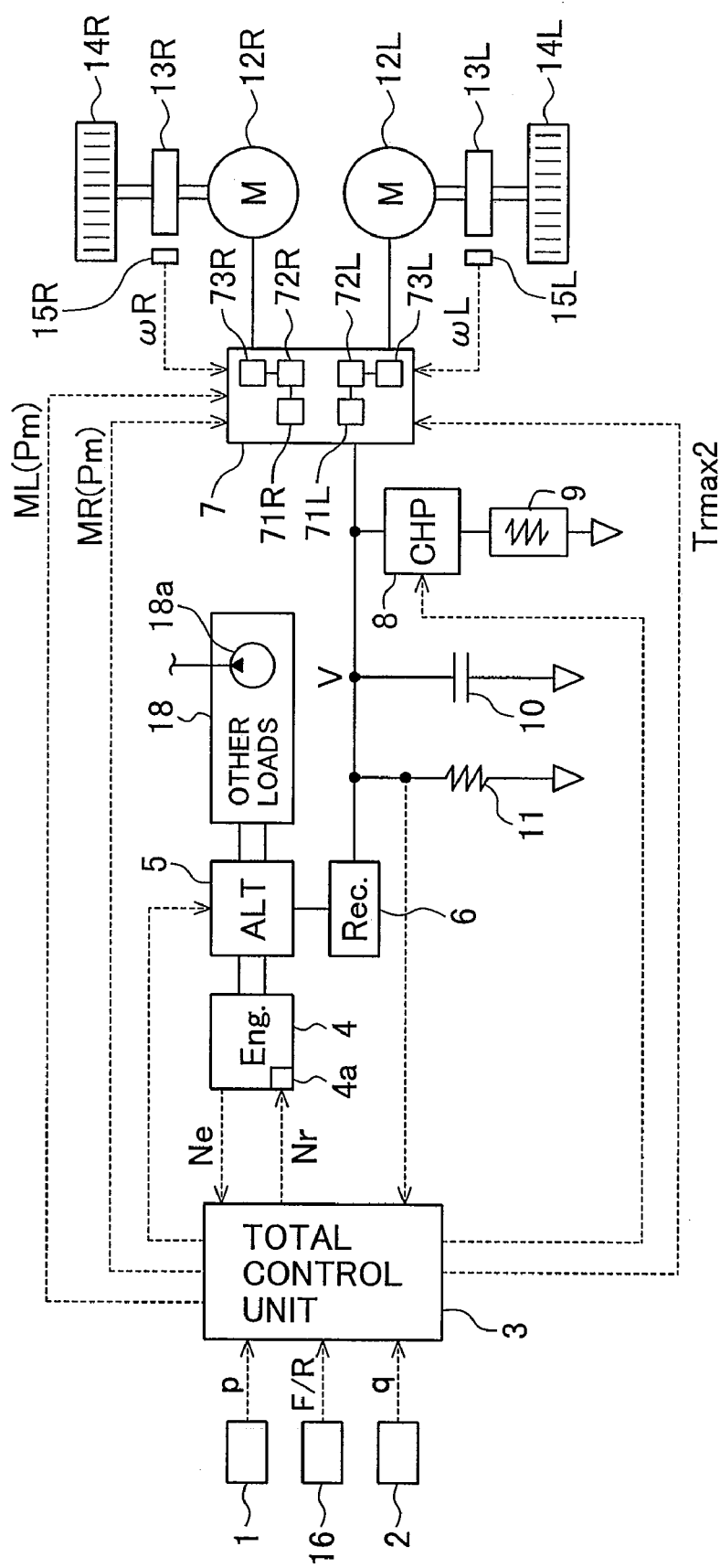
FIG. 1 is a diagram illustrating an overall configuration of a drive system of an electrically driven dump truck according to one embodiment of the present invention.

1: Accelerator pedal
2: Retard pedal
3: Total control unit
4: Prime mover (diesel engine)
5: Alternating-current generator
6: Rectifying circuit
7: Inverter control unit
8: Chopper circuit
9: Grid resistor
10: Capacitor
11: Resistor for detecting the voltage after rectification
12R, 12L: Right and left electric motors (induction motors)
13R, 13L: Speed reducer
14R, 14L: Right and left rear wheels (tires)
15R, 15L: Electromagnetic pickup sensors
16: Shift lever
18: Other prime mover loads
71R, 71L: Torque instruction operation units
72R, 72L: Motor control operation units
73R, 73L: Inverters (switching elements)
Nr1: First target revolution speed
Nr2: Second target revolution speed
Nr: Target revolution speed
Pm1: First target motor output horsepower
Pm2: Second target motor output horsepower
Pm0: Target motor output horsepower
Pmax: Upper limit of the motor output horsepower
Pm: Target motor output horsepower
Tr1R, Tr1L: Target motor torque
Trmax2: Motor acceleration torque
Trmax: Maximum allowable motor torque
TrR, TrL: Motor torque instruction value
Function Nr1(p): First target revolution speed characteristics
Function Nr2(P): Second target revolution speed characteristics function
Function Trmax2(p): Acceleration torque limit value characteristics

BEST MODE FOR CARRYING OUT THE INVENTION

One embodiment of the present invention will be described with reference to drawings as below.

FIG. 1 is a diagram illustrating an overall configuration of a drive system for an electrically driven dump truck according to one embodiment of the present invention.

In FIG. 1, the drive system for the electrically driven dump truck includes: an accelerator pedal 1; a retard pedal 2; a shift lever 16; a total control unit 3; a prime mover 4; an alternating-current generator 5; other prime mover loads 18; a rectifying circuit 6; an inverter control unit 7; a chopper circuit 8; a grid resistor 9; a capacitor 10; a resistor 11; right and left electric motors (for example, induction motors) 12R, 12L; speed reducers 13R, 13L; tires 14R, 14L; and electromagnetic pickup sensors 15R, 15L. The inverter control unit 7 includes: torque instruction operation units 71R, 71L that are used for the right and left electric motors 12R, 12L respectively; motor control operation units 72R, 72L; and inverters (switching elements) 73R, 73L.

A manipulate signal p of the accelerator pedal 1 and a manipulate signal q of the retard pedal 2 are inputted into the total control unit 3. The manipulate signals p and q become a signal for controlling the magnitude of the driving force, and a signal for controlling the magnitude of the retard force, respectively.

When a dump truck is moved forward or backward, an accelerator pedal 1 is pressed down with a shift lever 16 being located at a forward or reverse position. In response to it, a total control unit 3 issues, to a prime mover 4, an instruction indicating the target revolution speed Nr. As a result, a signal indicating the actual rotation speed Ne is returned from the prime mover 4 to the control unit 3. The prime mover 4 is a diesel engine that is equipped with an electronic governor 4a. When the electronic governor 4a receives an instruction indicating the target revolution speed Nr, the electronic governor 4a controls the fuel injection amount so that the prime mover 4 revolves at the target revolution speed Nr.

The alternating-current generator 5 is connected to the prime mover 4. The alternating-current generator 5 performs alternating current generation. The electric power obtained by the alternating current generation is rectified by the rectifying circuit 6 before the electric power is accumulated in the capacitor 10. A direct-current voltage value becomes V. The alternating-current generator 5 feeds back a voltage value, into which the direct-current voltage V is divided by the detection resistor 11. The total control unit 3 controls the alternating-current generator 5 so that the voltage value in question becomes a specified constant voltage V0.

The electric power generated by the alternating-current generator 5 is supplied to the right and left electric motors 12R, 12L through the inverter control unit 7. By controlling the alternating-current generator 5 so that the direct-current voltage V which has been rectified by the rectifying circuit 6 becomes the specified constant voltage V0, the total control unit 3 controls the supply of the electric power so that the electric power required for the electric motors 12R, 12L is supplied.

The horsepower MR, ML of the right and left electric motors 12R, 12L, which is instructed from the total control unit 3, and the rotational speed ωR, ωL of the electric motors 12R, 12L, which is detected by the electromagnetic pickups 15R, 15L, are inputted into the inverter control unit 7. Then, the inverter control unit 7 drives the electric motors 12R, 12L at a slip ratio of greater than 0 through the torque instruction operation units 71R, 71L, the motor control operation units 72R, 72L, and the inverters (switching elements) 73R, 73L respectively.

The right and left rear wheels (tires) 14R, 14L are connected to the electric motors 12R, 12L through the speed reducers 13R, 13L respectively. The electromagnetic pickups 15R, 15L are typically sensors for detecting the peripheral speed of one gear teeth included in the speed reducers 13R, 13L respectively. In addition, for example, if the right side driving system is taken as an example, a gear used for detection may also be given to a driving shaft inside the electric motor 12R, or to a driving shaft to which the speed reducer 13R and the tire 14R are connected, so that the electromagnetic pickup 15R is located at the position of the gear.

When the accelerator pedal 1 is released to press down on the retard pedal 2 during traveling, the total control unit 3 controls the alternating-current generator 5 so that the alternating-current generator 5 does not generate electricity. Moreover, because the horsepower instructions MR, ML issued from the total control unit 3 become negative, the inverter control unit 7 applies the brake force to a car body which travels by driving each of the electric motors 12R, 12L at a slip ratio of less than 0. At this time, each of the electric motors 12R, 12L acts as an electric generator. Accordingly, each of the electric motors 12R, 12L works so that the capacitor 10 is charged by a rectifying function that is built-into the inverter control unit 7. The chopper circuit 8 works so that the direct-current voltage value V becomes a predetermined direct-current voltage value V1. As a result, an electric current is fed to the grid resistor 9 to transform the electric energy into the thermal energy.

The prime mover 4 drives not only the alternating-current generator 5 but also components including: a hydraulic pump 18a (hereinafter referred to as a "hydraulic pump for working") for driving a hydraulic system that is used to move a vessel of the dump truck up and down, and that is used to perform steering operation; a cooling fan (not illustrated) used for sending air to a radiator; and a second electric generator (not illustrated) for driving an electric fan (not illustrated) that is used to cool the alternating-current generator 5, the grid resistor 9, the electric motors 12R, 12L, the control units 3, 7, and the like.

In FIG. 1, these components are illustrated as the other prime mover loads 18.

Up to this point, the basic configuration of the usual electrically driven dump truck has been described.

Next, characteristic part of the present invention will be described.

Figure 2:
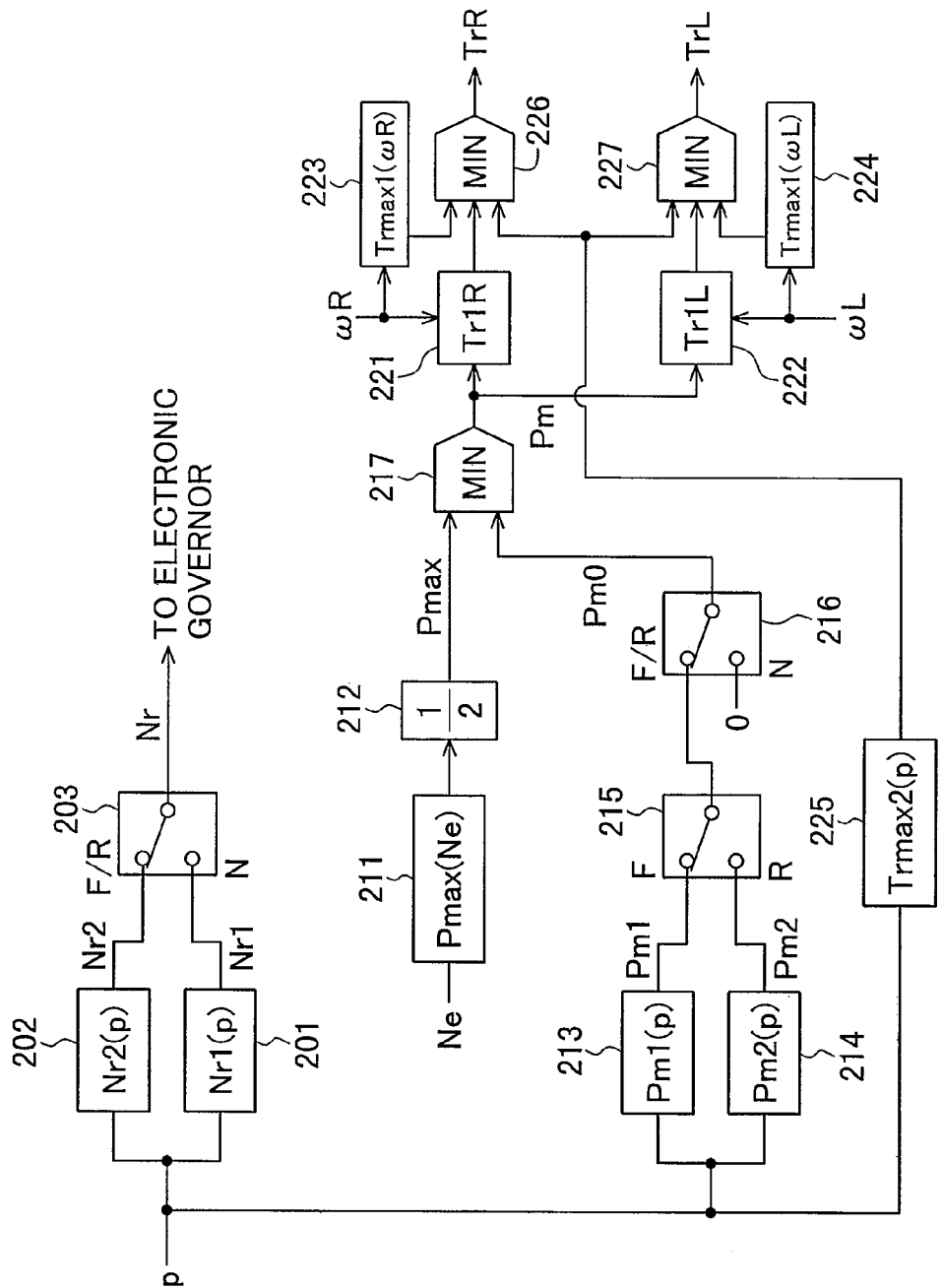
FIG. 2 is a functional block diagram illustrating processing steps of a drive system according to this embodiment.
Figure 3:
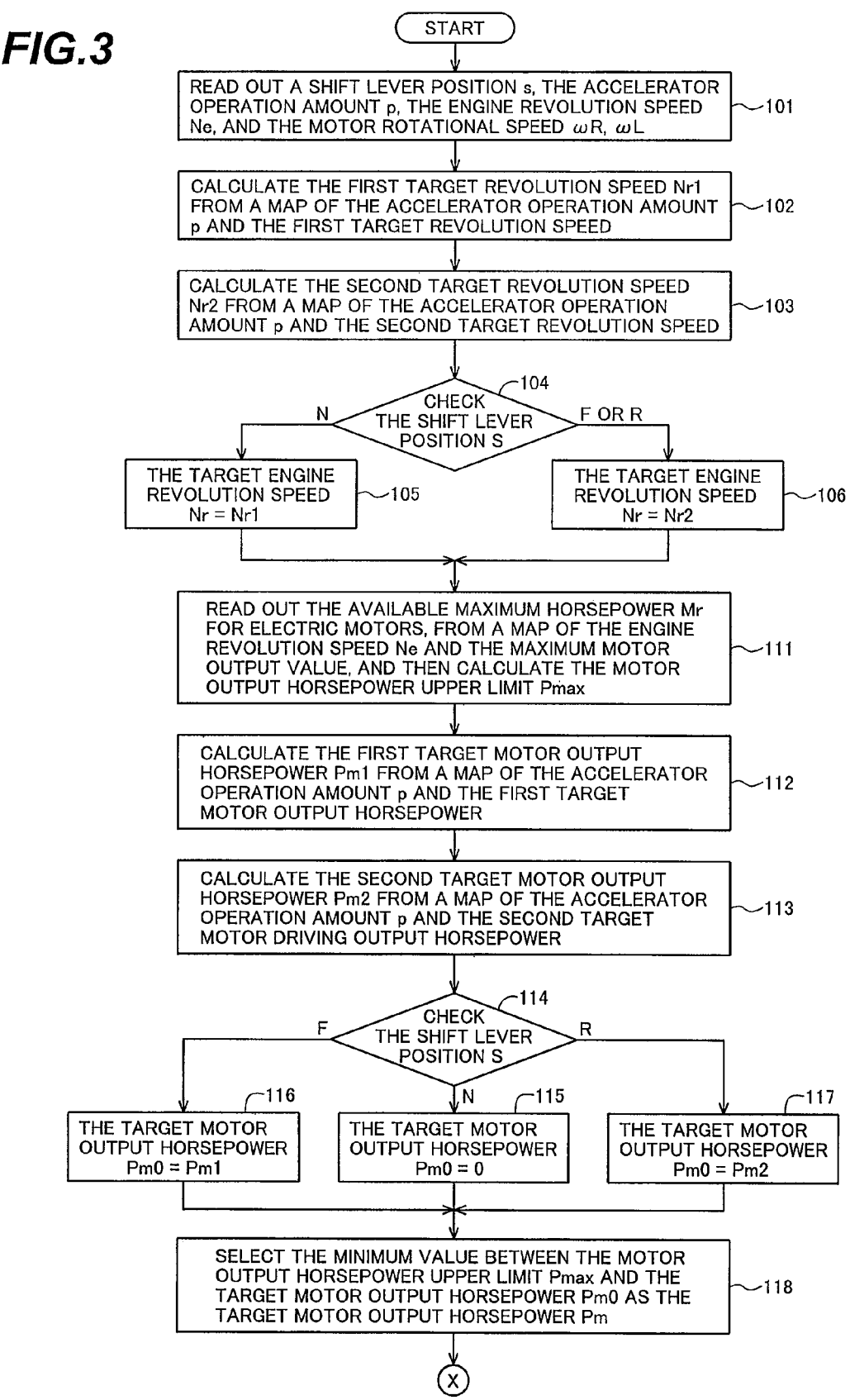
FIG. 3 is a flowchart illustrating processing steps.
Figure 4:
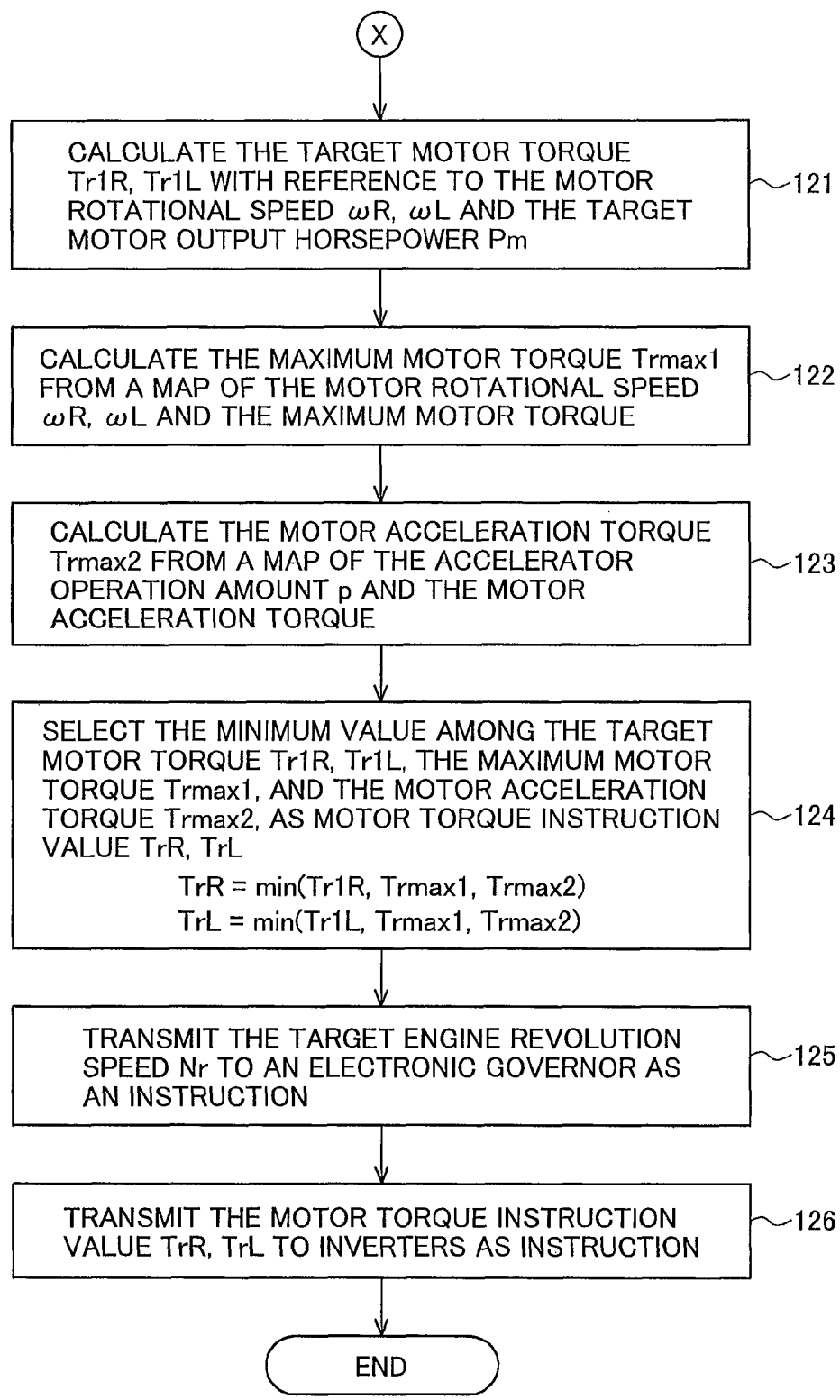
FIG. 4 is a flowchart illustrating processing steps.

According to the present invention, operation of each component is subjected to arithmetic processing according to processing steps stored in a memory, which is not illustrated. The memory is built into the total control unit 3 and the inverter control unit 7. FIG. 2 is a functional block diagram illustrating the processing steps. FIGS. 3, 4 are flowcharts each illustrating the processing steps. The processing steps will be described mainly according to FIG. 3 and the flowchart shown in FIG. 3, and supplementarily by use of the functional block diagram shown in FIG. 2, as below.

According to the process flow shown in FIGS. 3, 4, the process starts from START; and when the processing steps are performed up to END, the process returns to START again.

In a step 101, the following information is read out: the state quantity S indicating a switching position of the shift lever 16; the operation amount p of the accelerator pedal (hereinafter referred to as "the accelerator operation amount"); the actual revolution speed Ne of the prime mover 4; and the rotational speed ωR, ωL of the electric motors for traveling 12R, 12L (hereinafter referred to as "the motor rotational speed"). There are three switching positions of the shift lever 16, which are N (neutral), F (forward), and R (reverse).

In a step 102, the first target revolution speed Nr1 corresponding to the accelerator operation amount p, which has been read out in the step 101, is calculated with reference to a data map showing the relationship between the accelerator operation amount and the target prime mover revolution speed, the data map being expressed by a function Nr1($p$) (shown in FIG. 5) of the first target revolution speed to be used while the dump track is not traveling (block 201 shown in FIG. 2).

Figure 5:
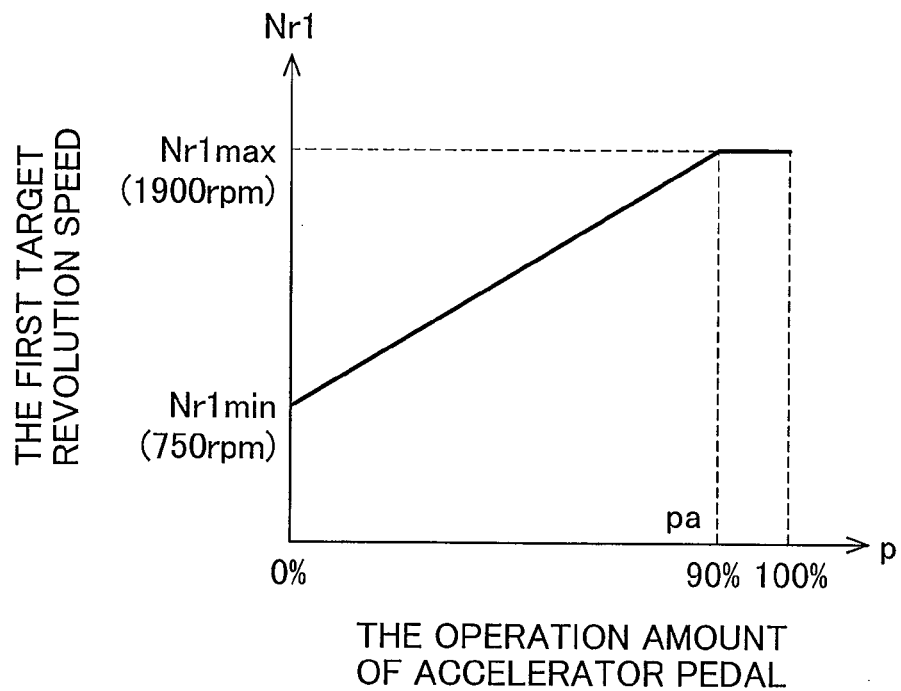
FIG. 5 is a chart illustrating a function Nr1(p) of the first target revolution speed at the time of non-traveling.

The function Nr1($p$) expresses the first target revolution speed characteristics that are suitable for driving of the hydraulic pump 18a for working. In FIG. 5, the function Nr1($p$) is configured as follows: when the operation amount of the accelerator pedal 1 is at 0, which means no operation, the first target revolution speed Nr1 is at the minimum revolution speed Nr1min of the prime mover 4 (that is to say, the first target revolution speed Nr1 is equivalent to the idle revolution speed); when the accelerator operation amount p falls within a range from 0 to the operation amount pa that is smaller than the maximum operation amount pmax, the first target revolution speed Nr1 increases from the minimum revolution speed Nr1min up to the maximum revolution speed Nr1max with the increase in the operation amount p of the accelerator pedal 1; and if the accelerator operation amount p exceeds the operation amount pa, the first target revolution speed Nr1 becomes constant at the maximum revolution speed Nrm1$ax$. The minimum revolution speed Nr1min is, for example, the revolution speed ranging from 700 rpm to 800 rpm. In the example illustrated in the figure, the minimum revolution speed Nr1min is 750 rpm. It is desirable that the maximum revolution speed Nr1max be the maximum rated revolution speed of the prime mover 4. For example, the maximum revolution speed Nr1max is the revolution speed ranging from 1800 rpm to 2100 rpm. In the example illustrated in the figure, the maximum revolution speed Nr1max is 1900 rpm.

In addition, it is desirable that the operation amount pa, which is smaller than the maximum operation amount pmax, range from 80% to 95% of the maximum operation amount pmax. In the example illustrated in the figure, the operation amount pa is 90% of the maximum operation amount pmax.

In a step 103, the second target revolution speed Nr2 corresponding to the accelerator operation amount p, which has been read out in the step 101, is calculated with reference to a data map showing the relationship between the accelerator operation amount and the target prime mover revolution speed, the data map being expressed by a function Nr2(p) (shown in FIG. 6) of the second target revolution speed to be used while the dump track is traveling (block 202 shown in FIG. 2).

Figure 6:
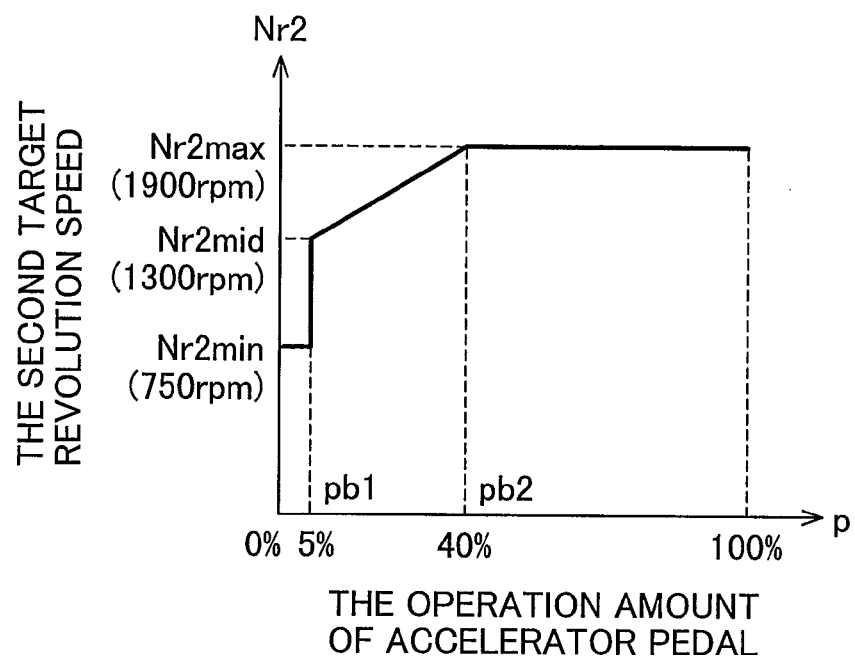
FIG. 6 is a chart illustrating a function Nr2(p) of the second target revolution speed at the time of traveling.

The function Nr2(p) expresses the second target revolution speed characteristics that are suitable for driving of the electric motors 12R, 12L. In FIG. 6, the function Nr2(p) is configured as follows: when the operation amount of the accelerator pedal 1 ranges from 0, which means no operation, to the very small operation amount Pb1, the second target revolution speed Nr2 is at the minimum revolution speed Nr2min (that is to say, the second target revolution speed Nr2 is equivalent to the idle revolution speed); if the operation amount of the accelerator pedal 1 reaches the very small operation amount Pb1, the second target revolution speed increases up to the medium-speed revolution speed Nr2mid step by step; when the accelerator operation amount p ranges from the very small operation amount Pb1 to the medium operation amount Pb2, the second target revolution speed Nr2 increases from the medium-speed revolution speed Nr2mid up to the maximum revolution speed Nr2max with the increase in the accelerator operation amount p; and if the accelerator operation amount p exceeds the medium operation amount Pb2, the second target revolution speed Nr2 becomes constant at the maximum revolution speed Nr2max. As is the case with the function Nr1(p), the minimum revolution speed Nr2min is, for example, the revolution speed ranging from 700 rpm to 800 rpm. In the example illustrated in the figure, the minimum revolution speed Nr2min is 750 rpm. It is desirable that the maximum revolution speed Nr2max be the revolution speed ranging from 1800 rpm to 2100 rpm. In the example illustrated in the figure, the maximum revolution speed Nr2max is 1900 rpm, which is the maximum rated revolution speed, and which is the same as the maximum revolution speed Nr1max of the function Nr1(p). If the minimum revolution speed Nr2min is 750 rpm, whereas the maximum revolution speed Nr2rnax is 1900 rpm, it is desirable that the medium-speed revolution speed Nr2mid be the revolution speed ranging from 900 rpm to 1600 rpm. In the example illustrated in the figure, the medium-speed revolution speed Nr2mid is 1300 rpm. Even if the minimum revolution speed Nr2min is set at a value other than 750 rpm, and even if the maximum revolution speed Nr2max is set at a value other than 1900 rpm, it is possible to define the medium-speed revolution speed Nr2mid as the revolution speed ranging from 900 rpm to 1600 rpm.

In addition, it is desirable that the very small operation amount Pb1 range from 2 to 8% of the maximum operation amount Pmax of the accelerator pedal. In the example illustrated in the figure, the very small operation amount Pb1 is 5% of the maximum operation amount pmax. It is desirable that the medium operation amount Pb2 range from 30 to 70% of the maximum operation amount Pmax. In the example illustrated in the figure, the medium operation amount Pb2 is 40% of the maximum operation amount Pmax.

Figure 7:
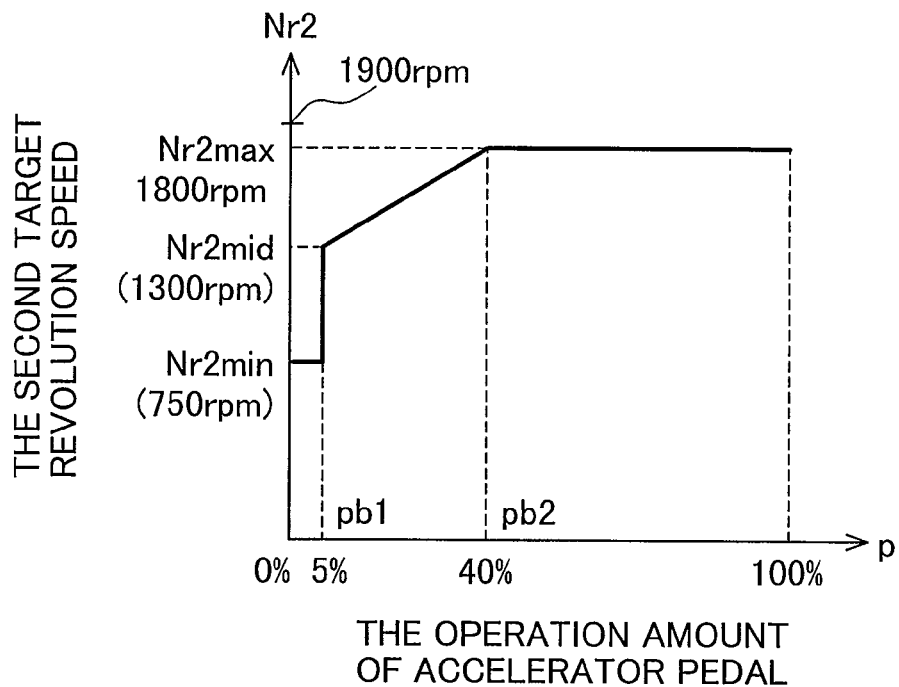
FIG. 7 is a chart illustrating a modified example of the function Nr2(p) of the second target revolution speed at the time of traveling.
Figure 8:
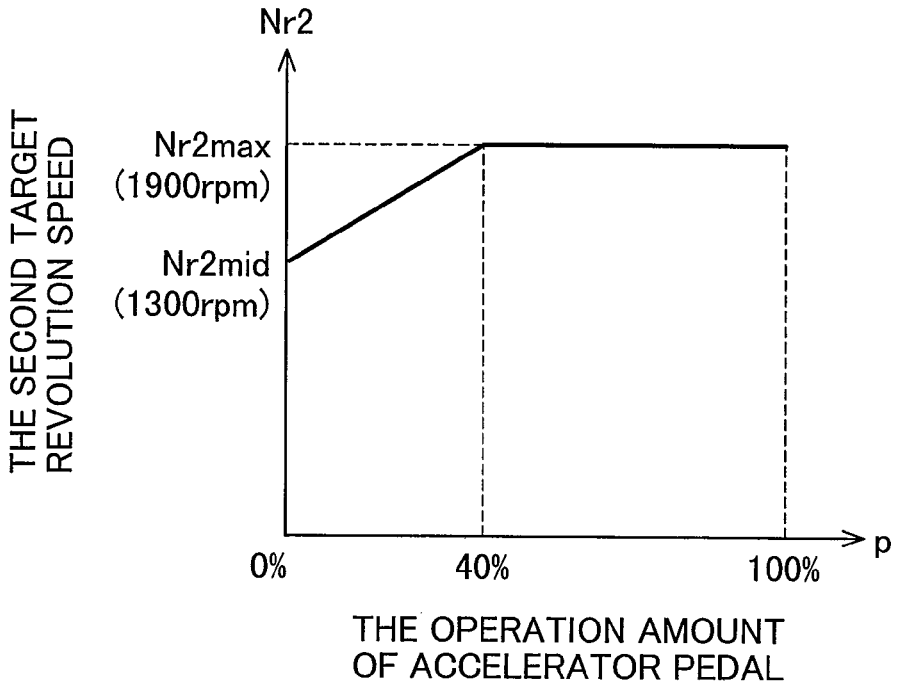
FIG. 8 is a chart illustrating another modified example of the function Nr2(p) of the second target revolution speed at the time of traveling.

FIGS. 7, 8 are charts each illustrating a modified example of the function Nr2(p) at the time of traveling. In the example shown in FIG. 6, the maximum revolution speed Nr2max of the traveling-time function Nr2(p) is set at the same value as that of the maximum revolution speed Nr1max of the non-traveling-time function Nr1(p). However, as shown in FIG. 7, the maximum revolution speed Nr1max of the traveling-time function Nr2(p) may also be set at a value of for example 1800 rpm, which is smaller than the maximum revolution speed Nrmax of the function Nr1(p) (the maximum rated revolution speed). In addition, in the example shown in FIG. 6, it is so configured that when the operation amount of the accelerator pedal 1 ranges from 0 to the very small operation amount Pb1, the second target revolution speed Nr2 becomes the minimum revolution speed Nr2min. However, as shown in FIG. 8, the operation amount range within which the second target revolution speed Nr2 becomes the minimum revolution speed Nrmin may also be eliminated. In the example shown in FIG. 10, it is so configured that when the operation amount of the accelerator pedal 1 is at 0, the second target revolution speed Nr immediately becomes the medium-speed revolution speed Nr2mid that is higher than the idle revolution speed, and that the second target revolution speed Nr2 then increases from the medium-speed revolution speed Nr2mid up to the maximum revolution speed Nr2max with the increase in the accelerator operation amount p from 0 to the medium operation amount Pb2.

In steps 104 through 106, if the state quantity S of the shift lever 16, which has been read out in the step 101, is N (neutral), the target revolution speed Nr of the prime mover 4 is set at Nr1 (Nr=Nr1). On the other hand, if the state quantity S of the shift lever 16 is F (forward) or R (reverse), the target revolution speed Nr of the prime mover 4 is set at Nr2 (Nr=Nr2) (block 203 shown in FIG. 2).

Figure 9:
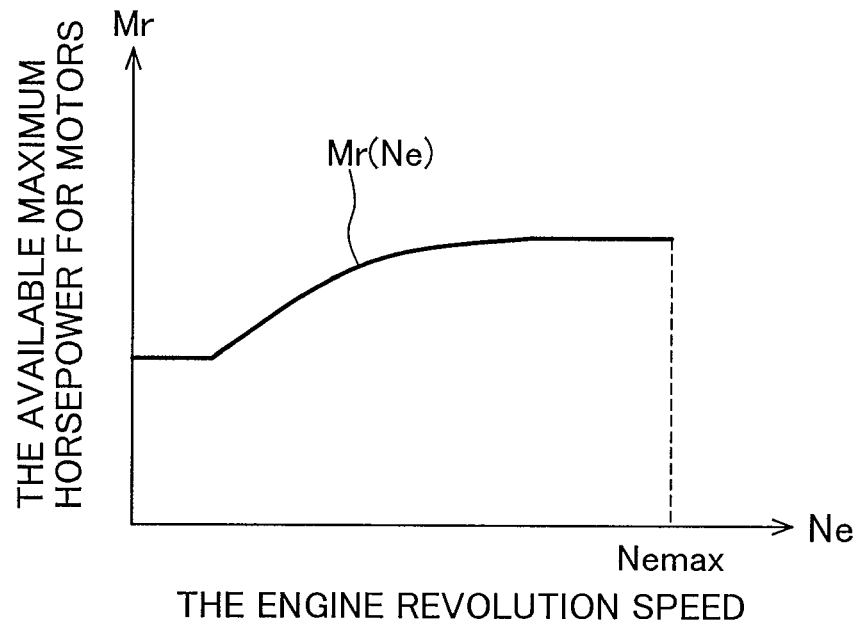
FIG. 9 is a chart illustrating a function Pmax(Ne) of the maximum motor output horsepower.

In a step 111, on the basis of the actual revolution speed Ne of the prime mover 4 that has been read out in the step 101, the corresponding maximum horsepower Mr which can be used by the electric motors 12R, 12L is calculated with reference to a data map showing the relationship between the engine revolution speed and the maximum motor output horsepower, the data map being expressed by a function Mr(Ne) of the maximum motor output horsepower shown in FIG. 9. Then, the maximum horsepower Mr is multiplied by ½ to calculate the output horsepower upper limit Pmax per one electric motor 12R or 12L (blocks 211, 212 shown in FIG. 2).

In FIG. 9, the function Mr(Ne) is so configured that with the increase in the actual revolution speed Ne of the prime mover 4 (hereinafter referred to as "the engine revolution speed"), the maximum horsepower Mr which can be used by the electric motors 12R, 12L (hereinafter referred to as the maximum motor output horsepower) increases.

How to set the function Mr(Ne) of the maximum motor output horsepower will be described.

Figure 10:
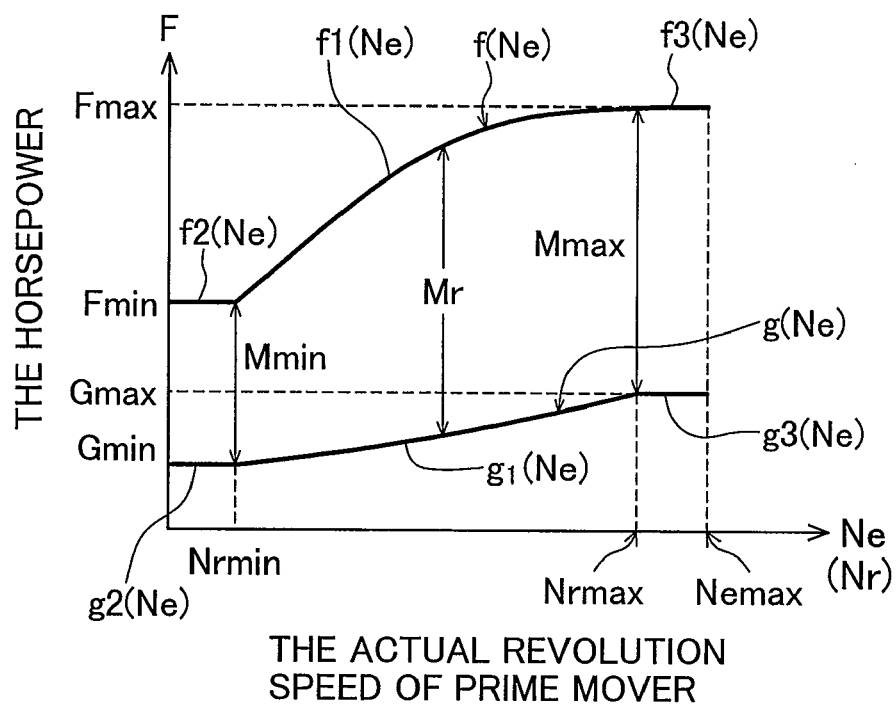
FIG. 10 is a chart illustrating a data map showing the relationship between the revolution speed and the maximum output horsepower of the prime mover, which is expressed by a function f(Ne), and illustrating a data map showing the relationship between the revolution speed and the other prime mover load loss horsepower, which is expressed by a function g(Ne)

FIG. 10 is a chart illustrating a data map showing the relationship between the revolution speed and the maximum output horsepower of the prime mover, which is expressed by a function f(Ne), and illustrating a data map showing the relationship between the revolution speed and the other prime mover load loss horsepower, which is expressed by a function g(Ne).

The function f(Ne) is used to determine the maximum output horsepower that can be generated by the prime mover 4. Here, the function f1(Ne), the function f2(Ne), and the function f3(Ne) are combined into the function f(Ne). The function f1(Ne) is equivalent to the function fr=f(Nr) based on the relationship between the target revolution speed Nr and the output horsepower of the prime mover 4. If the engine revolution speed Ne changes from Nrmin (for example, 750 rpm) up to Nrmax (for example, 2000 rpm), the maximum output horsepower f(Ne) which can be generated by the prime mover 4 changes from the minimum value Fmin up to the maximum value Fmax. This is a diagram illustrating a characteristic line that is specific to the prime mover 4. The function f2(Ne) is based on the assumption that the maximum output horsepower f(Ne) of the prime mover 4 is kept at a constant value of f2=Fmin within a range of 0≦Ne<Nrmin. The function f3(Ne) is based on the assumption that the maximum output horsepower f(Ne) of the prime mover 4 is kept at a constant value of f3=Fmax within a range of Nrmax<Ne≦Nemax.

The prime mover 4 drives not only the alternating-current generator 5 but also the other prime mover loads 18. The other prime mover loads 18 include: a hydraulic pump 18a for moving a vessel of the dump truck up and down, and for driving a hydraulic system used for steering operation; a cooling fan, which is not illustrated, the cooling fan being used for sending air to a radiator; and a second electric generator (not illustrated) for driving an electric fan (not illustrated) that is used to cool the alternating-current generator 5, the grid resistor 9, the electric motors 12R, 12L, and the control units 3, 7. Horsepower values, which are assigned beforehand to drive the other prime mover loads 18, are expressed by g(Ne) shown in FIG. 10. The horsepower g(Ne) is set at values which are slightly larger than those of the horsepower actually consumed by the other prime mover loads 18 so that a sufficient margin of the horsepower g(Ne) is left. In this specification, this horsepower is called the loss horsepower.

As is the case with the function (Ne), the function g1(Ne), the function g2(Ne), and the function g3(Ne) are combined into function g(Ne) of the loss horsepower. In the case of the function g1(Nr), if the engine revolution speed Ne changes from Nrmin (for example, 750 rpm) up to Nrmax (for example, 2000 rpm), the loss horsepower g1(Ne) changes from the minimum value Gmin up to the maximum value Gmax. The function g2(Ne) is based on the assumption that the loss horsepower g(Ne) is kept at a constant value of g2=Gmin within a range of 0≦Ne<Nrmin. The function g3(Ne) is based on the assumption that the loss horsepower g(Ne) is kept at a constant value of g3=Gmax within a range of Nrmax<Ne≦Nemax.

In FIG. 10, Mr, which is the difference (f(Ne)−g(Ne)) between f(Ne) and g(Ne), is the total effective maximum horsepower that can be applied to the electric motors 12R, 12L. In other words, Mr=(f(Ne)−g(Ne)) is the available maximum horsepower (an assigned horsepower value) for the electric motors 12R, 12L, which are used for traveling, out of the maximum output horsepower f(Ne) that can be generated by the prime mover 4. The maximum output horsepower of the electric motors 12R, 12L cannot exceed this value (more specifically, Mr=f(Ne)−g(Ne)).

The function Mr(Ne) of the maximum motor output horsepower is set on the basis of the thought as described above. The output horsepower upper limit Pmax per one electric motor 12R or 12L is expressed by the following equation:

$$Pmax=Mr/2=(f(Ne)-g(Ne))/2$$

Figure 11:
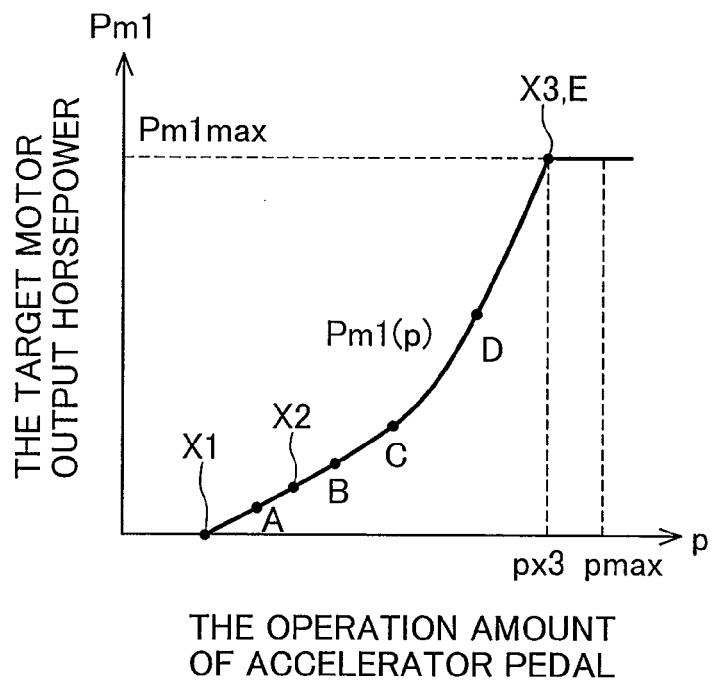
FIG. 11 is a chart illustrating a function Pm1(p) of the first target motor output horsepower at the time of traveling forward.

In a step 112, on the basis of the accelerator operation amount p that has been read out in the step 101, the first target motor output horsepower Pm1 corresponding to the accelerator operation amount p in question is calculated with reference to a data map showing the relationship between the accelerator operation amount and the target motor output horsepower, the data map being expressed by the function Pm1(p) of the first target motor output horsepower at the time of traveling forward shown in FIG. 11 (block 213 shown in FIG. 2).

In FIG. 11, the function Pm1(p) is configured as follows: if the accelerator operation amount p=0, the first target motor output horsepower Pm1=0; in a state in which the accelerator pedal is pressed down to a small extent (more specifically, starting from a point X1 shown in FIG. 11), Pm1 increases; subsequently an increasing rate of Pm1 increases from an area around a point X2; and then at a point X3 at which the accelerator operation amount is lower than the maximum value pmax, Pm1 reaches the maximum horsepower Pm1max that can be generated by the electric motors 12R, 12L. The accelerator operation amount px3 at the point X3 shown in FIG. 11 is, for example, about 95% of the maximum operation amount pmax.

In a step 113, on the basis of the accelerator operation amount p that has been read out in the step 101, the second target motor output horsepower Pm2 corresponding to the accelerator operation amount p in question is calculated with reference to a data map showing the relationship between the accelerator operation amount and the target motor output horsepower, the data map being expressed by the function Pm2(p) of the second target motor output horsepower at the time of traveling backward (block 214 shown in FIG. 2).

Figure 12:
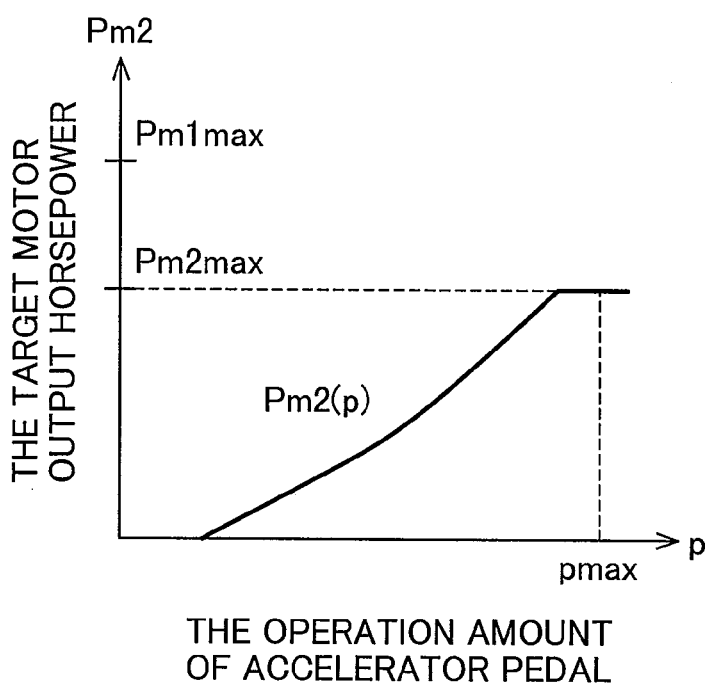
FIG. 12 is a chart illustrating a function Pm2(p) of the second target motor output horsepower at the time of traveling backward.

In FIG. 12, the function Pm2(p) is so configured that although the second target motor output horsepower Pm2 increases with the increase in the accelerator operation amount p, the maximum value Pm2rmax of the second target motor output horsepower becomes smaller than the maximum value Pm1max in the function Pm1(p) used for traveling forward. Incidentally, the target motor output horsepower for traveling backward may also be determined by multiplying the target motor output horsepower, which has been determined by the function Pm1(p) used for traveling forward, by a positive constant whose value is smaller than 1.

In steps 114 through 117, if the state quantity S of the shift lever 16, which has been read out in the step 101, is N (neutral), the target horsepower Pm0 of the electric motors 12R, 12L (hereinafter referred to as "the target motor output horsepower") is set at 0 (Pm0=0). If the state quantity S of the shift lever 16 is F (forward), the target horsepower Pm0 of the electric motors 12R, 12L (hereinafter referred to as "the target motor output horsepower") is set at Pm1 (Pm0=Pm1). If the state quantity S of the shift lever 16 is R (reverse), the target motor output horsepower Pm0 is set at Pm2 (Pm0=Pm2) (blocks 215, 216 shown in FIG. 2).

In a step 118, the smaller value is selected between the motor output horsepower upper limit Pmax and the target motor output horsepower Pm0 so that the selected value is used as the target motor output horsepower Pm (block 217 shown in FIG. 4).

$$Pm=\min(Pmax,Pm0)$$

To be more specific, in the step 118 (block 217 shown in FIG. 4), the target motor output horsepower Pm which is applied to the electric motors 12R, 12L is limited so that the target motor output horsepower Pm does not become Pmax or more. This target motor output horsepower Pm corresponds to the instructed horsepower MR, ML shown in FIG. 1 (MR=ML=Pm).

In a step 121, the target motor torque Tr1R, Tr1L is calculated from the target motor output horsepower Pm, and the rotational speed ωR, ωL of the electric motors 12R, 12L, which has been read out in the step 101, by the following equations respectively (blocks 221, 222 shown in FIG. 4).

$$Tr1R=K1 \times Pm/\omega R$$

$$Tr1L=K1 \times Pm/\omega L$$

K1: Constant used to calculate the torque from the horsepower and the rotational speed.

Figure 13:
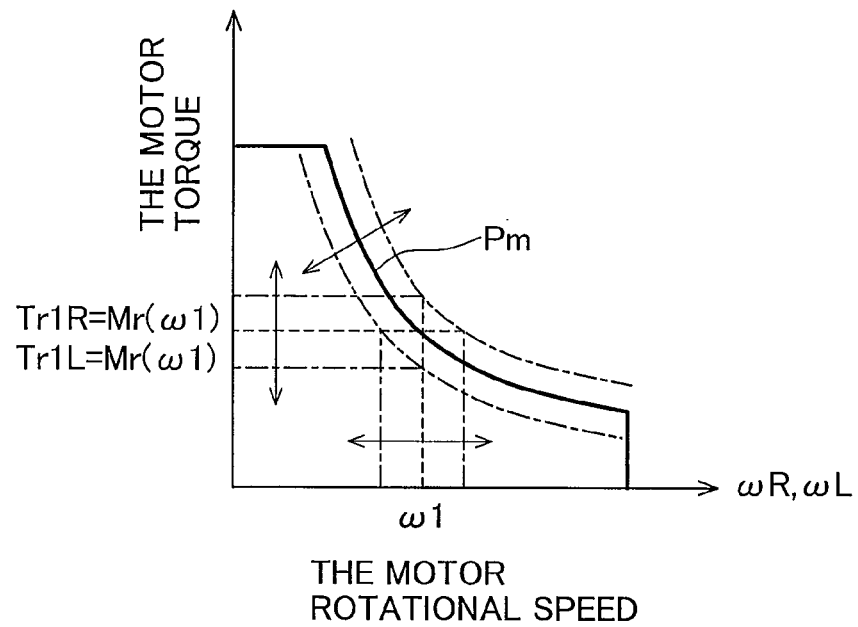
FIG. 13 is a chart illustrating the relationship among the target motor output horsepower Pm, the rotational speed ωR, ωL of the electric motors, and the target motor torque Tr1R, Tr1L.

FIG. 13 is a chart illustrating the relationship among the target motor output horsepower Pm, the rotational speed ωR, ωL of the electric motors 12R, 12L, and the target motor torque Tr1R, Tr1L. If the target motor output horsepower Pm is determined, the target motor torque Tr1R, Tr1L in response to the motor rotational speed ωR, ωL at this point of time is determined respectively. For example, when the motor rotational speed ωR, ωL is ω1, the target motor torque becomes Tr1R=Pm(ω1), Tr1L=Pm(ω1) respectively. Moreover, for example, when the dump truck comes to an upward slope, the load torque of the electric motors 12R, 12L increases, and accordingly the motor rotational speed ωR, ωL decreases, with the result that the target motor torque Tr1R, Tr1L increases in response to the increase in load torque respectively. In contrast with this, when the load torque of the electric motors 12R, 12L decreases, the target motor torque Tr1R, Tr1L decreases respectively. On the other hand, if the target motor output horsepower Pm is increased, the target motor torque Tr1R, Tr1L increases in response to the increase in target motor horsepower Pm respectively. If the motor load torque at this point of time is constant, the motor rotational speed ωR, ωL increases respectively. In contrast with this, if the target motor output horsepower Pm is decreased in a state in which the motor load torque is kept constant, the motor rotational speed ωR, ωL decreases respectively.

Figure 14:
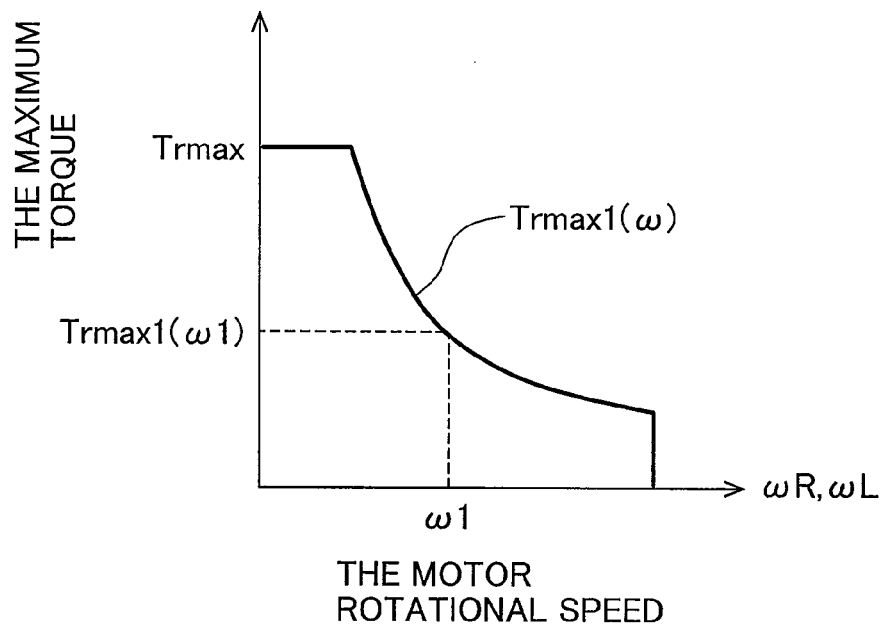
FIG. 14 is a chart illustrating a data map showing the relationship between the motor rotational speed and the maximum motor torque, which is expressed by a function Trmax1 (ω) of the maximum motor torque.

In a step 122, on the basis of the rotational speed ωR, ωL of the electric motors 12R, 12L, which has been read out in the step 101, the maximum motor torque Trmax1 corresponding to the rotational speed ωR, ωL in question is calculated with reference to a data map showing the relationship between the motor rotational speed and the maximum motor torque, the data map being expressed by a function Trmax1(ω) of the maximum motor torque shown in FIG. 14 (blocks 223, 224 shown in FIG. 4).

In FIG. 14, the function Trmax1(ω) is configured on the basis of specifications of units constituting the drive system. The specifications include: the maximum value of current which the inverters 73R, 73L can supply to the electric motors 12R, 12L; an output limit of a driver element such as IGBT or GTO included in the inverters 73R, 73L; and the intensity of each motor shaft. As shown in FIG. 14, for example, when the motor rotational speed ωR, ωL is ω1, the maximum motor torque Trmax1 becomes Trmax1 (ω1). The maximum value of the maximum motor torque Trmax1 is Trmax.

In a step 123, on the basis of the accelerator operation amount p that has been read out in the step 101, the motor acceleration torque Trmax2 corresponding to the accelerator operation amount p in question is calculated with reference to a data map showing the relationship between the accelerator operation amount and the motor acceleration torque, the data map being expressed by a function Trmax2(p) of the motor acceleration torque (block 225 shown in FIG. 4).

The function Trmax2(p) expresses characteristics of an acceleration torque limit value.

Figure 15:
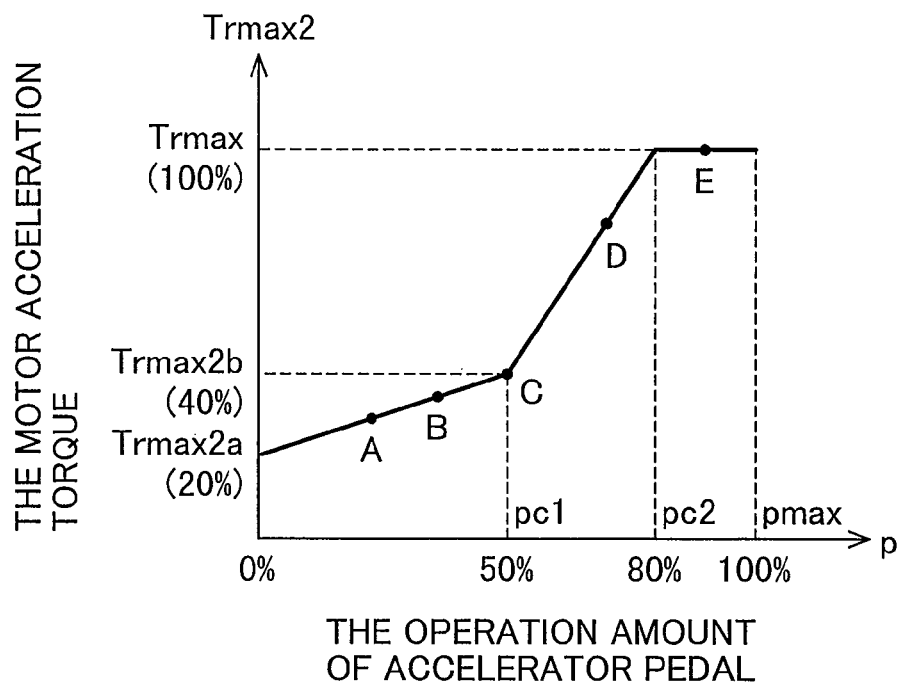
FIG. 15 is a chart illustrating a function Trmax2(p) of the motor acceleration torque.

In FIG. 15, the function Trmax2(p) is configured as follows: when the operation amount of the accelerator pedal 1 is at 0, which means no operation, the motor acceleration torque Trmax2 falls within a low torque range that is suitable for very slow traveling (preferably, the motor acceleration torque Trmax2 is kept at the minimum torque Trmax2a); when the operation amount p of the accelerator pedal is within a range from 0 to the medium operation amount pc1, which includes a very small operation amount area, with the increase in the accelerator operation amount p, the motor acceleration torque Trmax2 increases from the minimum torque Trmax2a up to the higher torque Trmax2b which falls within a high torque range that is suitable for very slow traveling; when the accelerator operation amount p is within a range from the medium operation amount pc1 to the operation amount pc2 that is smaller than the maximum operation amount pmax, with the increase in the accelerator operation amount p, the motor acceleration torque Trmax2 increases from the torque Trmax2b to the maximum torque Trmax, which is the maximum value of the maximum motor torque Trmax1 shown in FIG. 14, at an increasing rate that is higher than that within the range from 0 to the operation amount pc1; and if the accelerator operation amount p exceeds pc2, the motor acceleration torque Trmax2 becomes constant at the maximum value Trmax. The torque range which is suitable for very slow traveling is considered to be a range from about 15% to 50% of the maximum value Trmax (the maximum allowable motor torque) of the maximum motor torque Trmax1 shown in FIG. 14. It is desirable that the minimum torque Trmax2a at this point of time range from 15% to 30% of the maximum value Trmax. In the example illustrated in the figure, the minimum torque Trmax2a is 20% of the maximum value Trmax. It is desirable that the higher torque Trmax2b, which falls within the high torque range suitable for very slow traveling, range from 30% to 50% of the maximum value Trmax. In the example illustrated in the figure, the higher torque Trmax2b is 40% of the maximum value Trmax.

It is desirable that the medium operation amount pc1 range from 40% to 60% of the maximum operation amount pmax. In the example illustrated in the figure, the medium operation amount pc1 is 50% of the maximum operation amount pmax. It is desirable that the operation amount pc2 at which the motor acceleration torque Trmax2 becomes the maximum range from 70% to 95% of the maximum operation amount pmax. In the example illustrated in the figure, the operation amount pc2 is 80% of the maximum operation amount pmax.

In a step 124, comparisons are made among the target motor torque Tr1R, Tr1L determined in the step 121, the maximum motor torque Trmax1 determined in the step 122, and the motor acceleration torque Trmax2 determined in the step 123 to select the minimum values among them so that the selected values are used as motor torque instruction values TrR, TrL respectively (blocks 226, 227 shown in FIG. 4).

To be more specific, $$TrR=\min(Tr1R, Tr\max1, Tr\max2)$$

$$TrL=\min(Tr1L, Tr\max1, Tr\max2)$$

In a step 125, the target engine revolution speed Nr, which has been determined in the step 105 or 106, is transmitted to the electronic governor 4a of the prime mover 4 as an instruction.

In a step 126, the motor torque instruction values TrR, TrL, which have been determined by the motor control operation units 72R, 72L included in the inverter control unit 7 in the step 123, are transmitted to the inverters 73R, 73L as instructions so that the torque of the electric motors 12R, 12L is controlled respectively.

The processing performed in the steps 101 through 118 (the blocks 201 through 217 shown in FIG. 4), the processing performed in the step 123 (the block 225 shown in FIG. 3), and the processing performed in the step 125 are processing performed by the total control unit 3. On the other hand, the processing performed in the steps 121, 122, 124 (the blocks 221 through 224, and the blocks 226, 227, shown in FIG. 4) and in the step 126 is processing performed by the torque instruction operation units 71R, 71L of the inverter control unit 7.

Moreover, in the above description, the processing performed in the steps 112 through 117 (the blocks 213 through 216) forms target motor output horsepower calculation means for calculating the target motor output horsepower Pm0 corresponding to the operation amount of the accelerator pedal 1. The processing performed in the step 121 (the blocks 221, 222) forms target motor torque calculation means for calculating the target motor torque Tr1R, Tr1L on the basis of the target motor output horsepower Pm0 and the rotational speed ωR, ωL of the electric motors 12R, 12L respectively. The processing performed in the step 123 (the block 225) forms acceleration torque limit value calculation means for calculating acceleration torque limit values (the motor acceleration torque Trmax2) of the electric motors 12R, 12L corresponding to the operation amount of the accelerator pedal 1. The processing performed in the step 124 (the blocks 226, 227) forms motor torque instruction value determination means for, when the acceleration torque limit values (the motor acceleration torque Trmax2) are larger than the target motor torque Tr1R, Tr1L, selecting the target motor torque as the motor torque instruction values TrR, TrL respectively, and for, when the acceleration torque limit values (the motor acceleration torque Trmax2) are smaller than the target motor torque Tr1R, Tr1L, selecting the acceleration torque limit values as the motor torque instruction values TrR, TrL respectively. The processing performed in the step 126, and the torque instruction operation units 71R, 71L and the motor control operation units 72R, 72L, which are included in the inverter control unit 7, form inverter control means for controlling the inverters 73R, 73L on the basis of the motor torque instruction values TrR, TrL respectively.

The acceleration torque limit value calculation means (the step 123, the block 225) calculates, as the acceleration torque limit value, the motor acceleration torque Trmax2 corresponding to the operation amount of the accelerator pedal 1. The motor torque instruction value determination means (the step 124, the blocks 226, 227) makes comparisons among the target motor torque Tr1R, Tr1L, the motor acceleration torque Trmax2, and the maximum allowable motor torque Trmax, which is predetermined in response to the rotational speed of the electric motors 12R, 12L, so that the minimum values are selected among them.

In addition, the processing performed in the step 111 (the blocks 211, 212) forms maximum horsepower calculation means for, in response to the revolution speed of the prime mover 4, calculating the available maximum horsepower Pmax for the electric motors 12R, 12L. The processing performed in the step 118 (the block 217) forms motor output horsepower limiting means for limiting the target motor output horsepower Pm0 calculated by the target motor output horsepower calculation means (the steps 112 through 117, the blocks 213 through 216) so that the target motor output horsepower Pm0 does not exceed the maximum horsepower Pmax. The target motor torque calculation means (the step 121, the blocks 221, 222) calculates the target motor torque Tr1R, Tr1L from the target motor output horsepower Pm received from the motor output horsepower limiting means, and from the rotational speed ωR, ωL of the electric motors 12R, 12L respectively.

Next, operation of this embodiment will be described.

1. At the Time of non-Traveling

At the time of non-traveling, the shift lever 16 is located at the N (neutral) position. When the shift lever 16 is located at the N (neutral) position, the target horsepower Pm0 of the electric motors 12R, 12L is equivalent to 0 (Pm0=0). Accordingly, the motors are not driven.

On the prime mover side, a data map based on the function Nr1($p$) of the first target revolution speed at the time of non-traveling shown in FIG. 5 is selected. Accordingly, the first target revolution speed Nr1 determined by the function Nr1($p$) is provided as the target revolution speed Nr of the prime mover 4. Therefore, at the time of non-operation in which the accelerator pedal 1 is not pressed down, the target revolution speed Nr of the prime mover 4 becomes 750 rpm, which is the idle revolution speed. This makes it possible to minimize the fuel consumption, and to improve the fuel efficiency. In addition, when the accelerator pedal 1 is pressed down, the target revolution speed Nr of the prime mover 4 increases from 750 rpm up to 1900 rpm, which is the rated revolution speed, in response to the extent to which the accelerator pedal 1 is pressed down. This causes the revolution speed of the prime mover 4 to change over a wide range from the minimum value to the maximum value. As a result, when the dump truck is stopped to execute work with only a hydraulic system being operated (for example, at the time of moving up a vessel), it is possible to stably operate the prime mover 4, and to achieve the maximum flow of the hydraulic pump 18$a$, so that the working speed can be adjusted over a wide range.

2. At the Time of Normal Traveling

At the time of normal traveling, the shift lever 16 is located at the F (forward) position. When the shift lever 16 is located at the F (forward) position, a data map based on the function Pm1($p$) of the first target motor output horsepower at the time of forward traveling shown in FIG. 11, which has been calculated in the step 112, is selected on the electric motor side. Accordingly, the first target motor output horsepower Pm1 determined by function Pm1($p$) is provided as the target motor output horsepower Pm0.

On the prime mover side, a data map based on the function Nr2($p$) of the second target revolution speed at the time of traveling shown in FIG. 6 is selected. Accordingly, the second target revolution speed Nr2 determined by the function Nr2($p$) is provided as the target revolution speed Nr of the prime mover 4. Therefore, at the time of non-operation in which the accelerator pedal 1 is not pressed down, the target revolution speed Nr of the prime mover 4 becomes 750 rpm, which is the idle revolution speed. This makes it possible to minimize the fuel consumption, and to improve the fuel efficiency. In addition, if the accelerator pedal 1 is pressed down to a small extent at the time of starting traveling, the target revolution speed Nr of the prime mover 4 immediately increases up to 1300 rpm, which is the medium-speed revolution speed. After that, in response to the extent to which the accelerator pedal is pressed down, the target revolution speed Nr of the prime mover 4 increases from 1300 rpm up to 1900 rpm, which is the maximum revolution speed (the rated revolution speed). As a result, the revolution speed of the prime mover 4 changes from the medium-speed revolution speed up to the maximum revolution speed with good responsiveness. Accordingly, the responsiveness at the time of pressing down the accelerator pedal 1 is improved, and the excellent acceleration performance can be achieved.

Moreover, as shown in FIG. 7, if the maximum revolution speed of the function Nr2($p$) is set at for example 1800 rpm, which is lower than the rated revolution speed (1900 rpm), the output horsepower of the prime mover 4 slightly decreases, which causes the traveling speed to slightly decrease. However, it is possible to reduce the fuel consumption at the time of traveling. It is also often the case that when the dump truck travels along an upslope road under conditions of mine roads with the vessel thereof being loaded with earth and sand and mined objects, the slope of the upslope road is small (for example, only about 5 to 7%). In such a case, some users request that higher priority is placed on the decrease in fuel consumption even if the traveling speed decreases to some extent. By setting the maximum revolution speed at a value that is lower than the rated revolution speed, it is possible to satisfy such user requests.

As shown in FIG. 8, if it is so configured that when the operation amount of the accelerator pedal 1 is at 0, the second target revolution speed Nr immediately becomes the medium-speed revolution speed Nr2mid that is higher than the idle revolution speed, even if the accelerator pedal is not operated, the prime mover 4 is controlled so that the prime mover 4 is kept at the medium-speed revolution speed Nr2mid. Accordingly, the fuel consumption increases in comparison with the example shown in FIG. 6. However, in this case, the responsiveness at the time of pressing down the accelerator pedal 1 is further improved. This makes it possible to produce an effect of further increasing the acceleration performance at the time of traveling.

In addition, on the electric motor side, when the accelerator pedal 1 is pressed down nearly to the maximum extent, in the step 123, it is possible to determine, as the motor acceleration torque Trmax2, the maximum value Trmax of the maximum motor torque Trmax1 from a data map based on the function Trmax2($p$) of the motor acceleration torque shown in FIG. 15. Therefore, the motor acceleration torque Trmax2 for the control (traveling control) of the electric motors 12R, 12L is not limited. Therefore, because the electric motors 12R, 12L are controlled on the basis of the first target motor output horsepower Pm1 (the target motor output horsepower Pm0), which has been calculated in the step 112, it is possible to achieve excellent operational feeling in which the operation amount of accelerator pedal 1 is well balanced with the output horsepower of the electric motors 12R, 12L.

Moreover, on the electric motor side, in a step 111, the maximum horsepower Pmax which can be used by the electric motors 12R, 12L is calculated in response to the revolution speed of the prime mover 4. Then, in a step 118, the target motor output horsepower Pm0 is limited so that it does not exceed the maximum horsepower Pmax. Therefore, when acceleration is performed at the time of starting traveling, the revolution speed of the prime mover 4 does not sufficiently increase, which causes the target motor output horsepower Pm0 to exceed the maximum horsepower Pmax. Even in such a case, the target motor output horsepower Pm0 is limited to the maximum horsepower Pmax. Accordingly, it is possible to prevent the prime mover 4 from stalling.

3. At the Time of Very Slow Traveling

At the time of very slow traveling, the shift lever 16 is located at the F (forward) position. The accelerator pedal 1 is pressed down only to a small extent. At this time, on the electric motor side, the first target motor output horsepower Pm1 on the basis of the function Pm1($p$) of the first target motor output horsepower at the time of traveling forward shown in FIG. 11 is determined as the target motor output horsepower Pm0. On the prime mover side, the first target revolution speed Nr1 on the basis of the function Nr1($p$) of the first target revolution speed at the time of non-traveling shown in FIG. 6 is determined as the target revolution speed Nr of the prime mover 14. The above-described processing performed on the electric motor side, and that on the prime mover side, are the same as the processing performed at the time of normal traveling.

In addition, on the electric motor side, when the accelerator pedal 1 is pressed down only to a small extent, if the extent to which the accelerator pedal 1 is pressed down is, for example, about 0 to 50%, a value ranging from 20 to 40% of the maximum value Trmax of the maximum motor torque Trmax1 is determined as the motor acceleration torque Trmax2 on the basis of the function Trmax2($p$) of the motor acceleration torque shown in FIG. 15. Then, in the step 124 in which the minimum value is selected from among the target torque Tr1R, Tr1L, the maximum motor torque Trmax1, and the motor acceleration torque Trmax2, the motor acceleration torque Trmax2 is selected as the motor torque instruction values TrR, TrL. Therefore, the traveling torque at the time of operating the accelerator pedal 1 to a very small extent, and a change in the torque, can be reduced to smaller values. This makes it possible to achieve excellent controllability, and to easily make a delicate positioning, at the time of very slow traveling.

Figure 16:
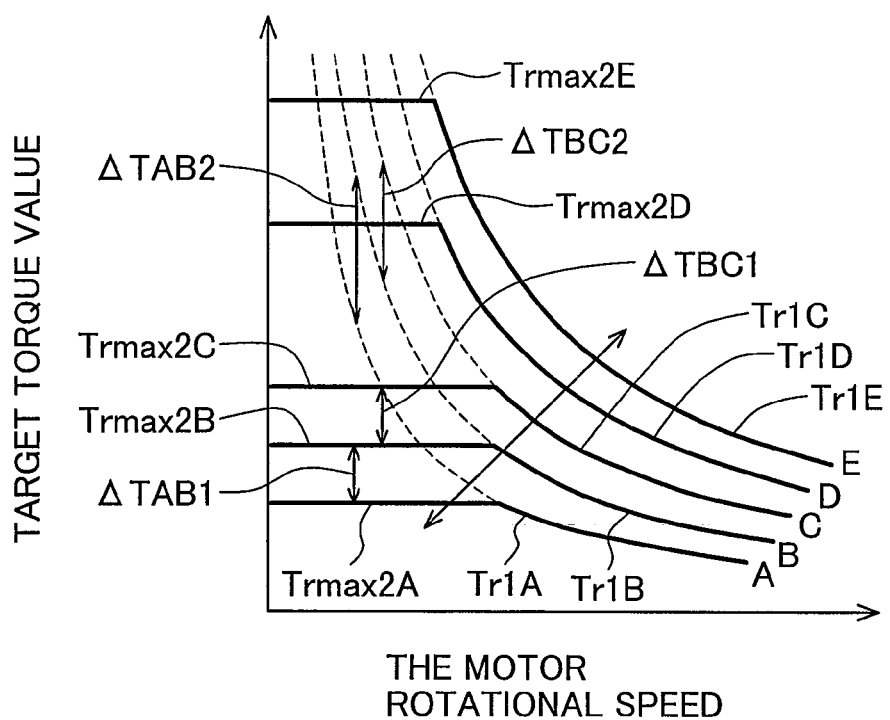
FIG. 16 is a chart illustrating the result of selecting the minimum value between the target motor torque Tr1R, Tr1L and the motor acceleration torque Trmax2.

FIG. 16 is a chart illustrating the result of selecting the minimum value between the target motor torque Tr1R, Tr1L and the motor acceleration torque Trmax2 in the step 124 (blocks 226, 227). In the figure, A, B, C, D, E correspond to points A, B, C, D, E shown in FIGS. 11, 15 respectively.

When the accelerator operation amount corresponds to each of the points A, B, C, D, E shown in FIG. 11, in the step 121 (the blocks 221, 222), the target motor torque Tr1RA, Tr1LA through Tr1RE, Tr1LE (hereinafter referred to as Tr1A through Tr1E), which is illustrated with solid-line and broken-line hyperbolas shown in FIG. 16, is calculated from the first target motor output horsepower corresponding to each of the points of A, B, C, D, E shown in FIG. 11, and from the function Pm1($p$) of the first target motor output horsepower. In addition, when the accelerator operation amount corresponds to each of the points A, B, C, D, E shown in FIG. 15, in the step 123 (the block 225), the motor acceleration torque Trmax2A through Trmax2E, which is illustrated with solid-line straight lines shown in FIG. 16, is calculated from the function Trmax2($p$) of the motor acceleration torque. In the step 124 (the blocks 226, 227), a smaller value is selected from these values. As a result, the motor torque instruction values TrR, TrL become values as illustrated with the solid lines shown in FIG. 16.

In FIG. 16, the motor torque instruction values, which are illustrated in the solid lines A, B, C, are values obtained when the accelerator operation amount p is smaller than 50%. The maximum value thereof is reduced to a small value ranging from 20% to 40% of the maximum value Trmax of the maximum motor torque Trmax1 by the motor acceleration torque Trmax2A through Trmax2C. Moreover, as understood from, for example, the comparison between ΔTAB1 and ΔTAB2 (ΔTAB1<ΔTAB2), and the comparison between ΔTBC1 and ΔTBC2 (ΔTBC1<ΔTBC2), the change in motor torque instruction value corresponding to the change in the accelerator operation amount at the time of the operation of the accelerator pedal is also reduced to a value that is smaller than the amount of change in motor torque instruction value of each of the target motor torque Tr1A through Tr1E.

Thus, by reducing the maximum value of the motor torque instruction value to a smaller value with the accelerator operation amount p being kept smaller than 50%, and by reducing the change in motor torque instruction value corresponding to the change in the accelerator operation amount at the time of operating the accelerator pedal to a smaller value, the traveling torque by the electric motors 12R, 12L at the time of operating the accelerator pedal, and a change in the traveling torque in question, become smaller, which causes a change in the traveling speed to become smaller. This makes it possible to improve the controllability at the time of very slow traveling.

As described above, according to this embodiment, when the operation amount of the accelerator pedal 1 ranges from 0 to 50%, the maximum torque for driving the electric motors 12R, 12L is reduced to a value ranging from 20 to 40%; when the operation amount of the accelerator pedal 1 is 50% or more, the maximum torque is increased; and when the operation amount of the accelerator pedal 1 nearly reaches 100%, a limit value of the maximum torque is set at 100%. As a result, at the time of normal traveling, it is possible to achieve excellent operational feeling in which the operation amount of accelerator pedal 1 is well balanced with the output horsepower of the electric motors 12R, 12L. When the operation amount of the accelerator pedal 1 is small, by limiting the torque, and the change in torque, to low values, it is possible to achieve excellent controllability at the time of very slow traveling, and to easily make a delicate positioning.

In addition, when a hydraulic system is driven at the time of non-traveling (for example, when the vessel is moved up and down with the shift lever 15 being located at the N position without traveling), for example, the target revolution speed ranging from 750 to 1900 rpm is provided in response to the operation amount of the accelerator pedal 1. At the time of traveling during which the shift lever 16 is located at the F position or the R position, for example, the target revolution speed of the prime mover 4 ranging from 1300 to 1900 rpm is provided in response to the accelerator pedal 1. Therefore, when the hydraulic system is driven at the time of non-traveling, it is possible to stably operate the prime mover, and to achieve the maximum flow of the hydraulic pump, so that the working speed can be adjusted over a wide range. At the time of traveling, the responsiveness at the time of pressing down the accelerator pedal is improved, which makes it possible to achieve the excellent acceleration. Moreover, even at the time of traveling during which the shift lever 16 is located at the F or R position, the target revolution speed of the prime mover 4 becomes the minimum revolution speed at the time of not operating the accelerator pedal 1. Accordingly, it is possible to improve the fuel efficiency.

A second embodiment of the present invention will be described with reference to FIGS. 17 through 19. According to this embodiment, instead of determining the motor acceleration torque from the accelerator operation amount, a limit ratio of the motor torque is determined.

Figure 17:
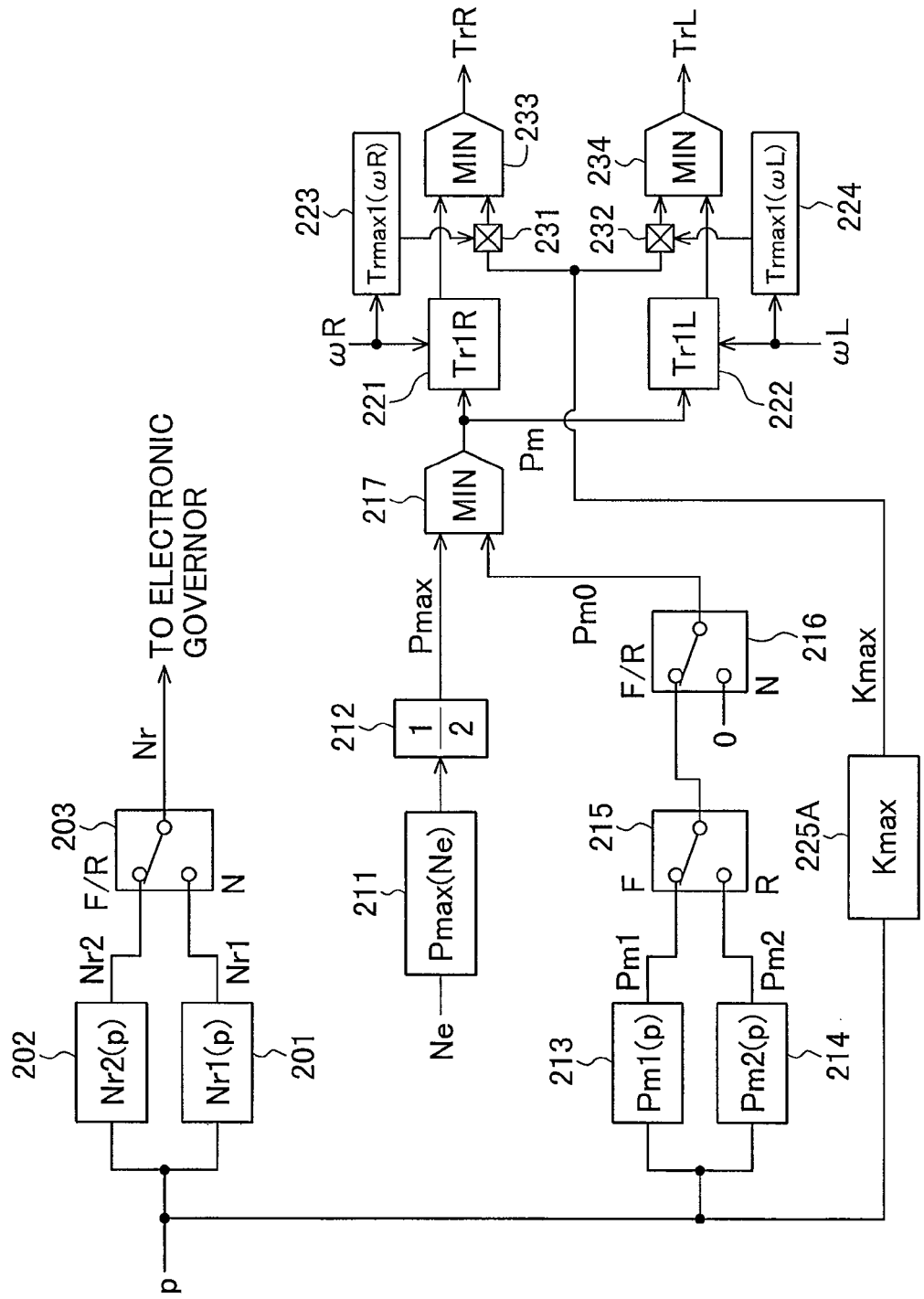
FIG. 17 is a functional block diagram illustrating processing steps of a drive system according to a second embodiment.
Figure 18:
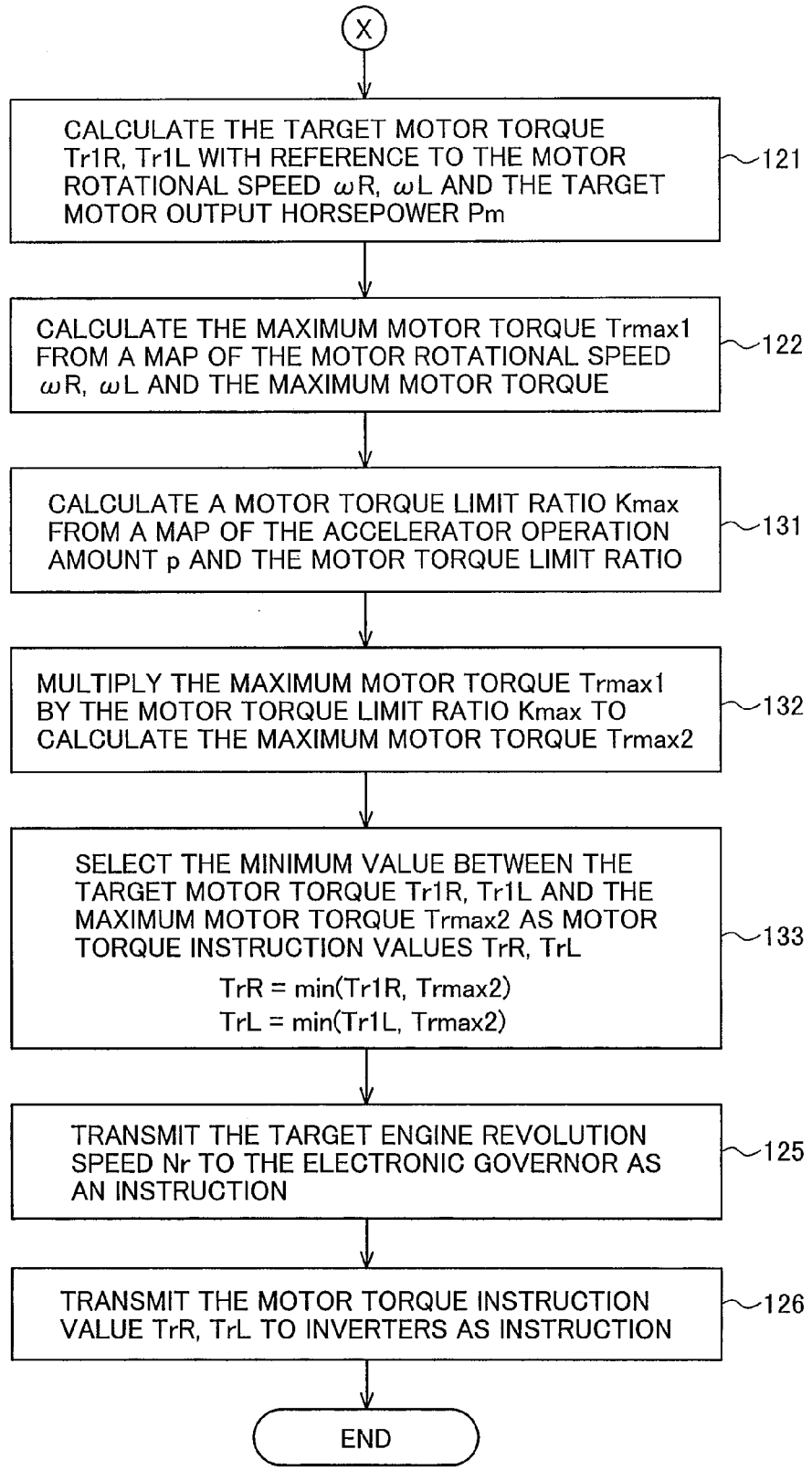
FIG. 18 is a flowchart illustrating processing steps according to the second embodiment.

FIG. 17 is a functional block diagram that is similar to FIG. 2, the functional block diagram illustrating processing steps of a drive system according to this embodiment. FIG. 18 is a flowchart illustrating the processing steps, the flowchart corresponding to FIG. 4 according to the first embodiment.

In this embodiment, processing steps of the control on the prime mover side (processing steps in the steps 101 through 106 shown in FIG. 3), and processing steps before the maximum motor torque Tmax1 is calculated on the electric motor side (processing steps from the step 111 shown in FIG. 3 up to the step 122 shown in FIG. 4), are the same as those in the first embodiment. In this embodiment, in a step 122, the maximum motor torque Trmax1 is calculated from the rotational speed ωR, ωL of the electric motors 12R, 12L and the function Trmax1(ω) of the maximum motor torque. After that, in a step 131, a motor torque limit ratio Kmax corresponding to the operation amount of the accelerator pedal 1 is calculated with reference to a data map showing the relationship between the accelerator operation amount and the motor torque limit ratio, the data map being expressed by a function Kmax(p) of the motor torque limit ratio shown in FIG. 19 (block 225A in FIG. 17).

Figure 19:
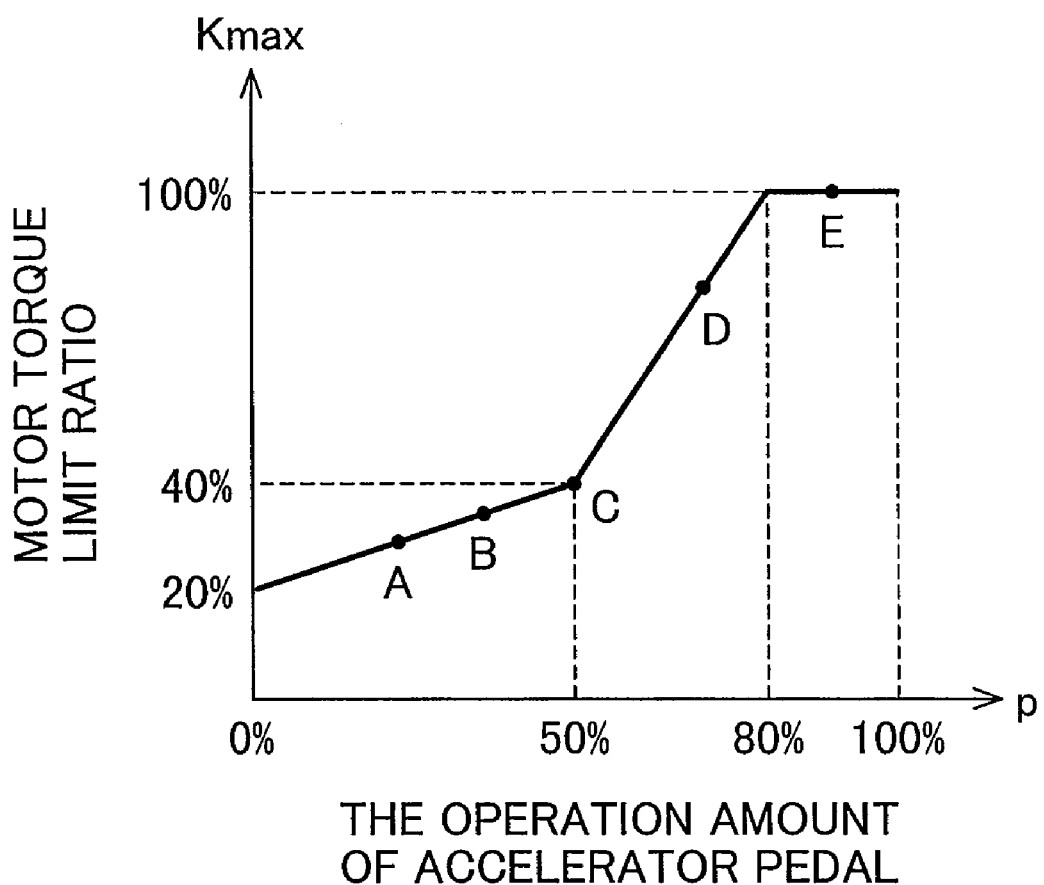
FIG. 19 is a chart illustrating a function Kmax(p) of a motor torque limit ratio.

In FIG. 19, the function Kmax(p) is made by assigning a limit ratio (in percent) to the vertical axis of the function of the motor acceleration torque shown in FIG. 15, and by replacing a numerical value of the limit ratio with a ratio (%) to the maximum allowable motor torque Trmax.

In a step 132, the maximum motor torque Trmax1 is multiplied by the motor torque limit ratio Kmax, which has been determined in the step 131, to calculate the maximum motor torque Trmax2 (blocks 231, 232 shown in FIG. 17).

In a step 133, the target motor torque Tr1R, Tr1L is compared with the maximum motor torque Trmax2, which has been determined in the step 132, to select the minimum value between them so that the selected values are used as motor torque instructed values TrR, TrL respectively (blocks 233, 234 shown in FIG. 17).

To be more specific, $$TrR = \min(Tr1R, Trmax2)$$

$$TrL = \min(Tr1L, Trmax2)$$

The subsequent steps 125, 126 are the same as those described in the first embodiment in FIG. 4. The target engine revolution speed Nr is transmitted to the electronic governor 4a of the prime mover 4 as an instruction, and the motor torque instruction values TrR, TrL are transmitted to the inverters 73R, 73L as instructions.

In the above description, as is the case with the processing performed in the step 123 (the block 225) in the first embodiment, the processing performed in the steps 131, 132 (the blocks 225A, 231, 232) form acceleration torque limit value calculation means for calculating acceleration torque limit values (the maximum motor torque Trmax2) of the electric motors 12R, 12L corresponding to the operation amount of the accelerator pedal 1. As is the case with the processing performed in the step 124 (the blocks 226, 227) in the first embodiment, the processing performed in the step 133 (the blocks 233, 234) forms motor torque instruction value determination means for, when the acceleration torque limit value (the maximum motor torque Trmax2) is larger than the target motor torque Tr1R, Tr1L, selecting the target motor torque as motor torque instruction values TrR, TrL, and for, if the acceleration torque limit value (the maximum motor torque Trmax2) becomes smaller than the target motor torque Tr1R, Tr1L, selecting acceleration torque limit values (the maximum motor torque Trmax2) as the motor torque instruction values TrR, TrL.

As described above, also in this embodiment, processing functions, which are included in the steps 131, 132 (the blocks 225A, 231, 232) and in the step 133 (the blocks 233, 234), are the same as those included in the step 123 (the block 225) and in the step 124 (the blocks 226, 227) in the first embodiment. Therefore, it is possible to achieve excellent operational feeling in which the operation amount of the accelerator pedal is well balanced with the output horsepower of the electric motors. It is also possible to achieve excellent controllability at the time of very slow traveling, and to easily make a delicate positioning.

Up to this point, the embodiments of the present invention have been described. However, the present invention can be changed in various ways within the spirit and scope of the present invention. Some examples thereof will be described as below.

For example, in the embodiment described above, in the step 111 (the block 211), on the basis of the actual revolution speed Ne of the prime mover 4, the corresponding maximum horsepower Mr which can be used by the electric motors 12R, 12L is determined with reference to the function Mr(Ne) of the maximum motor output horsepower. However, usually the accelerator pedal is not rapidly operated, and accordingly the actual revolution speed Ne of the prime mover 4 is substantially equivalent to the target revolution speed Nr. Therefore, instead of using the actual revolution speed Ne of the prime mover 4, the target revolution speed Nr may also be used to determine the available maximum horsepower Mr for the electric motors 12R, 12L. In addition, the output horsepower upper limit Pmax per one electric motor 12R or 12L is calculated with the maximum horsepower Mr being halved (½). However, in the step 118 (the block 217), after selecting the smaller value between the motor output horsepower upper limit Pmax and the target motor output horsepower Pm0, the smaller value in question may also be halved (½) so that the halved value is used as the target motor output horsepower Pm.

Moreover, although the electric motors 12R, 12L are induction motors, they may also be synchronous motors.

The invention claimed is:

1. A drive system of an electrically driven dump truck comprising:
   a prime mover;
   an alternating-current generator driven by the prime mover;
   at least two electric motors for traveling, each of which is driven by the electric power supplied by the alternating-current generator;
   at least two inverters, each of which is connected to the alternating-current generator, and each of which controls one of the electric motors; and
   motor control means for controlling the inverters in response to the operation amount of an accelerator pedal to control the electric motors;
   wherein the motor control means includes:
   target motor output horsepower calculation means for calculating the target motor output horsepower corresponding to the operation amount of the accelerator pedal;
   target motor torque calculation means for calculating the target motor torque on the basis of the target motor output horsepower and the rotational speed of the two electric motors;
   acceleration torque limit value calculation means for calculating acceleration torque limit values of the two electric motors corresponding to the operation amount of the accelerator pedal;
   motor torque instruction value determination means for, when the acceleration torque limit values are larger than the target motor torque, selecting the target motor torque as motor torque instruction values, and for, when the acceleration torque limit values become smaller than the target motor torque, selecting the acceleration torque limit values as motor torque instruction values; and
   inverter control means for controlling the inverters on the basis of the motor torque instruction values.

2. The drive system of the electrically driven dump truck according to claim 1, wherein:
   the acceleration torque limit value calculation means calculates the acceleration torque limit values on the basis of acceleration torque limit value characteristics that are configured as follows:
   when the operation amount of the accelerator pedal is at 0, the acceleration torque limit values are the low range torque that is suitable for very slow traveling;
   when the operation amount of the accelerator pedal falls within a range from 0 to the medium operation amount, which includes a small operation amount area, with the increase in the operation amount of the accelerator pedal, the acceleration torque limit values increase from the minimum torque up to a high range torque that is suitable for very slow traveling; and
   when the operation amount of the accelerator pedal further increases, the acceleration torque limit values increase up to the maximum torque.

3. The drive system of the electrically driven dump truck according to claim 2, wherein:
   the low range torque, which is suitable for very slow traveling, ranges from 15% to 30% of the maximum allowable motor torque that is predetermined in response to the rotational speed of the electric motors;
   the high range torque, which is suitable for very slow traveling, ranges from 30% to 50% of the maximum allowable motor torque; and
   the medium operation amount ranges 40% to 60% of the maximum operation amount.

4. The drive system of the electrically driven dump truck according to claim 1, wherein:
   the acceleration torque limit value calculation means calculates, as the acceleration torque limit values, the motor acceleration torque corresponding to the operation amount of the accelerator pedal; and
   the motor torque instruction value determination means compares among the target motor torque, the motor acceleration torque, and the maximum allowable motor torque, which is predetermined in response to the rotational speed of the electric motors, so that the minimum values are selected among them.

5. The drive system of the electrically driven dump truck according to claim 1, wherein:
   the acceleration torque limit value calculation means calculates the maximum motor torque, as the acceleration torque limit values, the maximum motor torque being a value that is obtained by multiplying the maximum allowable motor torque, which is predetermined in response to the rotational speed of the electric motors, by a motor torque limit ratio that is calculated in response to the operation amount of the accelerator pedal; and
   the motor torque instruction value determination means compares the target motor torque with the maximum motor torque so that each minimum value is selected between them.

6. The drive system of the electrically driven dump truck according to claim 1, further comprising:
   maximum horsepower calculation means for, in response to the revolution speed of the prime mover, calculating an available maximum horsepower for the electric motors for traveling; and
   motor output horsepower limiting means for limiting the target motor output horsepower calculated by the target motor output horsepower calculation means so that the target motor output horsepower does not exceed the maximum horsepower calculated by the maximum horsepower calculation means,
   wherein:
   the target motor torque calculation means calculates the target motor torque from the target motor output horsepower received from the motor output horsepower limiting means, and from the rotational speed of the two electric motors respectively.

* * * * *